United States Patent
Go

(10) Patent No.: US 6,330,367 B2
(45) Date of Patent: Dec. 11, 2001

(54) IMAGE ENCODING AND DECODING USING SEPARATE HIERARCHICAL ENCODING AND DECODING OF LOW FREQUENCY IMAGES AND HIGH FREQUENCY EDGE IMAGES

(75) Inventor: Shiyu Go, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/809,294

(22) Filed: Mar. 16, 2001

Related U.S. Application Data

(62) Division of application No. 08/425,990, filed on Apr. 20, 1995, now Pat. No. 6,226,414.

(30) Foreign Application Priority Data

Apr. 20, 1994 (JP) .................................................. 6-081305
Apr. 20, 1994 (JP) .................................................. 6-081306

(51) Int. Cl.[7] .............................. G06K 9/36; G06K 9/46
(52) U.S. Cl. .......................... 382/240; 382/263; 382/264
(58) Field of Search ................................ 382/238, 240, 382/248, 263–264, 277, 199; 341/79; 348/397.1, 398.1, 402.1, 407.1, 408.1, 413.1, 416.1, 437.1, 438.1, 699; 375/240.1, 240.11, 240.16, 240.19, 240.21; 358/432

(56) References Cited

U.S. PATENT DOCUMENTS

| | | | |
|---|---|---|---|
| 3,035,121 | 5/1962 | Schreiber | 348/397.13 |
| 4,908,872 | 3/1990 | Toriu et al. | 382/242 |
| 5,050,230 * | 9/1991 | Jones et al. | 382/166 |
| 5,124,811 | 6/1992 | Ohsawa et al. | 358/426 |
| 5,359,674 | 10/1994 | Wal | 382/261 |
| 5,414,780 | 5/1995 | Carnahan | 382/232 |
| 5,434,808 | 7/1995 | Cohen | 708/402 |
| 5,442,459 * | 8/1995 | Gahang | 358/433 |
| 5,550,936 | 8/1996 | Someya et al. | 382/263 |

FOREIGN PATENT DOCUMENTS

| | | | |
|---|---|---|---|
| 93-13624 | 7/1993 | (WO) | H04N/7/13 |
| 93-20653 | 10/1993 | (WO) | H04N/7/133 |

OTHER PUBLICATIONS

"Compact Image Coding from Edges with Wavelets," Stephane Mallat et al, ICASSP Proceedings, *IEEE*, 1991, pp. 2745–2748.

"Characterization of Signals From Multiscale Edges," S. Mallat et al., *IEEE Transaction on Pattern Analysis and Machine Intelligence*, vol. 14, No. 7, Jul. 1992, pp. 710–732.

"Edge Modified Vector Quantization For Image Compression," P. Yu et al., *Discovering A New World Of Communications*, Chicago, Jun. 14–18, 1992, vol. 1 of 4, Jun. 1992, Institute of Electrical and Electronics Engineers, pp. 532–536.

"Image Sequence Coding Using Oriented Edges," G. Guinta et al., *Signal Processing. Image Communication*, vol. 2, No. 4, Dec. 1990, pp. 429–440.

(List continued on next page.)

*Primary Examiner*—Timothy M. Johnson
(74) *Attorney, Agent, or Firm*—Venable; Robert Frank; Allen Wood

(57) ABSTRACT

A digitized image is encoded by detecting edges in the image, encoding the position and sharpness of the detected edges, filtering the image by a low-pass filter to generate a low-frequency image, and encoding the low-frequency image. A digitized image encoded in this way is reconstructed by generating a horizontal edge image and a vertical edge image from the encoded edge position and sharpness information, synthesizing a pair of high-frequency images by filtering the horizontal and vertical edge images with an edge synthesis filter, decoding the low-frequency image, and performing an inverse wavelet transform on the decoded low-frequency image and the high-frequency images.

21 Claims, 17 Drawing Sheets

OTHER PUBLICATIONS

"Hierarchical Video Coding Scheme With Scalability And Compatibility," Tsuyoshi Hanamura et al., *Electronics & Communications In Japan*, Part I, Communications, vol. 77, No. 3, Mar. 1994, pp. 25–40.

"Region And Texture Coding Of TV Pictures," D. Morgan et al., International Conference On Image Processing And Its Applications, Jul. 18, 1989, pp. 536–540.

Eddins et al., A Three–Source Multirate Model for Image Compression, Apr. 1990, pp. 2089–2094, IEEE, ICASSP-90, 5 pages, vol. 2970.*

* cited by examiner

IMAGE ENCODING AND DECODING USING SEPARATE HIERARCHICAL ENCODING AND DECODING OF LOW FREQUENCY IMAGES AND HIGH FREQUENCY EDGE IMAGES

CROSS REFERENCE TO RELATED APPLICATION

This is a division of application Ser. No. 08/425,990, filed Apr. 20, 1995, now U.S. Pat. No. 6,226,414, the disclosure of which is incorporated herein by reference.

BACKGROUND OF THE INVENTION

This invention relates to a compressive image encoding and decoding method using edge synthesis and the inverse wavelet transform, and to digital image encoding and decoding devices employing this method.

Compression is essential for efficient storage and transmission of digitized images. Compression methods have been described by the Joint Photographic Experts Group (JPEG) for still images, and the Motion Picture Experts Group (MPEG) for moving images. The JPEG method involves a discrete cosine transform (DCT), followed by quantization and variable-length encoding. The MPEG method involves detecting motion vectors. Both methods require substantial computation, the detection of motion vectors being particularly demanding.

Recently there has been much interest in the wavelet transform as a means of obtaining high compression ratios with relatively modest amounts of computation. This transform employs a family of wavelets related by dilation and translation; that is, the family consists of occurrences of the same basic wavelet at different locations and on different scales. If the scales form a progressively doubling sequence, and if the basic wavelet is zero everywhere except in a limited domain, wavelet transforms and inverse wavelet transforms can be carried out with efficient computational algorithms.

A wavelet transform can be described as a filtering process executed at each wavelet scale. A digitized image, for example, is transformed by filtering with the basic wavelet, then with the basic wave let dilated by a factor of two, then with the basic wavelet dilated by a factor of four, and so on.

One prior-art wavelet encoding scheme employs a complementary pair of wavelets to divide an image into a high-frequency component and a low-frequency component. These components contain information about variations on scales respectively less than and greater than a certain cut-off scale. This process is iterated on the low-frequency component with a doubling of the wavelet scale, obtaining new low-frequency and high-frequency components, then iterated again on the new low-frequency component, and so on. After a certain number of iterations, the components are encoded by an encoding scheme that works from low-toward high-frequency information. This scheme enables accurate image reconstruction, but retains too much high-frequency information to achieve high compression ratios.

Another prior-art wavelet encoding scheme employs a basic wavelet that is the first derivative of a smoothing filter (that is, the first derivative of a low-pass filtering function). This type of wavelet acts as a high-pass filter. High-frequency information is obtained by detecting local peaks (local maxima of absolute values) in the result of the wavelet transform, which correspond to edges in the original image. The size and location of the peak values at a selected scale are encoded, along with a low-frequency image obtained by smoothing at the largest scale of the wavelet transform. Fairly high compression ratios can be obtained in this way.

To reconstruct the original image from the encoded data, this prior-art method employs an algorithm derived from a mathematical procedure involving iterated projections in Hilbert space. Unrder ideal conditions, the projections converge toward a unique set of data that (i) have the required local peak values and (ii) are within the range of the wavelet transform operator. An inverse wavelet transform is then carried out on the converged data to obtain the original image.

It has yet to be shown, however, that the projections always converge, or that data satisfying conditions (i) and (ii) are unique. In practice, there is difficulty in knowing when to stop iterating. For some images, it seems that data satisfying (i) and (ii) are not unique, and instead of converging, the iteration wanders endlessly through Hubert space, first approaching the desired image transform, then moving away again.

Still higher compression ratios have been obtained by a fractal compression scheme, but this requires a very large amount of computation in the encoding process.

SUMMARY OF THE INVENTION

It is accordingly an object of the present invention to encode digitized images efficiently, with a high compression ratio but without requiring extensive computation.

Another object of the invention is to encode moving images efficiently.

Still another object is to reconstruct digitized images from encoded information efficiently and reliably.

Yet another object is to reconstruct digitized moving images efficiently and reliably.

The invented method of encoding a digitized image comprises the steps of:

detecting edges in the digitized image;

encoding the position and sharpness of the detected edges to generate edge information;

filtering the digitized image by a low-pass filter to generate a low-frequency image; and encoding the low-frequency image to generate low-frequency information.

The invented method of reconstructing a digitized image encoded by the invented encoding method comprises the steps of:

generating a horizontal edge image and a vertical edge image from the encoded edge information;

synthesizing a pair of high-frequency images by filtering the horizontal edge image and vertical edge image with an edge synthesis filter;

decoding the encoded low-frequency information to obtain a low-frequency image; and performing an inverse wavelet transform on the low-frequency image and the high-frequency images.

DETAILED DESCRIPTION OF THE INVENTION

Embodiments of the invention will be now described with reference to the attached illustrative drawings, starting with the simplest case in which the inverse wavelet transform is limited to a single scale. The following terminology will be used.

A (two-dimensional) digitized image is an array of pixels halving values x(i, j), where the horizontal coordinate i and vertical coordinate j range over sets of integers. The range of these coordinates is the size of the image, i.e. the number of pixels in the horizontal and vertical directions. The pixel values represent, for example, intensity gradations.

A one-dimenisional image is a horizontal or vertical line in a two-dimensional digitized image, i.e. a set of pixels with values x(i) indexed by a single coordinate.

A standard edge is a one-dimensional image having just one sharp variation point. An example would be an image with pixel values that change first at one constant rate, then at a different constant rate, such as the following:

. . . 2.0 1.5 1.0 0.5 0 0.5 1.0 1.5 2.0 . . .

Figure 3:
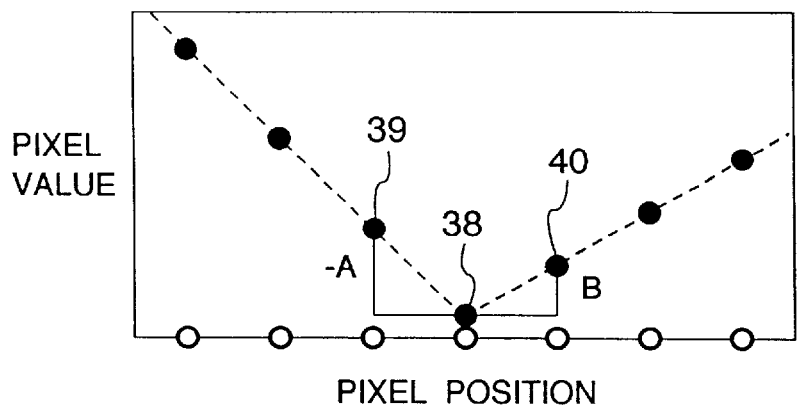
FIG. 3 is a graph illustrating pixel values at an edge.
Figure 4:
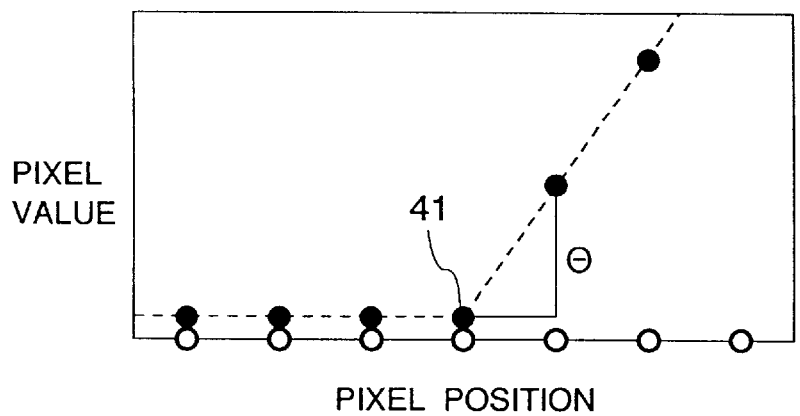
FIG. 4 is a graph illustrating pixel values at another edge.

In this standard edge the pixel values first decrease at a rate of −0.5 per pixel, then increase at a rate of +0.5 per pixel. Other standard edges of the same general type are shown in FIGS. 3 and 4. A standard edge serves as a basic model for all the edges occurring in a digitized image.

Down-sampling a digitized image means reducing its size by a process generally analogous to photographic reduction. Up-sampling means increasing the size of an image by a process generally analogous to photographic enlargement. In up- or down-sampling the entire image is enlarged or reduced, its features increasing or decreasing in scale.

A (one-dimensional) filter is a set of coefficients f(k), where k ranges over the integers. The non-zero coefficients f(k) are the taps of the filter.

The Fourier transform F of a filter f is defined as follows, where summation is over all taps, e is the natural logarithm base, and j is the square root of minus one.

$$F(\omega) = \sum_{k} f(k) \cdot e^{-j\omega k}$$

The conjugate f* of a filter f is obtained by reversing the order of coefficients:

$$f^*(k) = f(-k)$$

The Fourier transform of f* is therefore the complex conjugate of the Fourier transform of f.

A filter has even symmetry around $i_0$ if it has equal values on both sides of $i_0$; that is, for all integers k:

$$f(i_0 - k) = f(i_0 + k)$$

In particular, a filter has even symmetry around zero if it is equal to its own conjugate.

A filter has odd symmetry around $i_0$ if it has opposite values on both sides of $i_0$, that is:

$$f(i_0 - k) = -f(i_0 + k)$$

A filter satisfies the exact reconstruction condition if its fourier transform F satisfies the following condition for all values of ω:

$$|F(\omega)|^2 + |F(\omega + \pi)|^2 = 1$$

Two filters with Fourier transforms G and H satisfy the exact reconstruction condition if:

$$|G(\omega)|^2 + |H(\omega)|^2 = 1$$

Filters satisfying these exact reconstruction conditions, also referred to as perfect reconstruction conditions, are well known in the wavelet transform art. A pair of filters satisfying the second exact reconstruction condition above is referred to as a complementary pair.

To filter a one-dimensional image x by a filter f means to obtain a new one-dimensional image y with the following pixel intensities:

$$y(i) = \sum_{k} x(i+k) \cdot f(k)$$

This operation is equivalent to the conventional convolution operation using the conjugate filter f*.

$$y(i) = \sum_{k} x(i-k) \cdot f*(k)$$

The difference between convolution and filtering, as the term is used herein, is purely one of notation. The meaning of the following description and claims would be unchanged if the terms convolution and convolve were used throughout.

To filter a digitized image x horizontally by a filter f means to obtain a new image y as follows:

$$y(i, j) = \sum_k x(i+k, j) \cdot f(k)$$

Similarly, filtering image x vertically by f means:

$$y(i, j) = \sum_k x(i, j+k) \cdot f(k)$$

Filtering can be done two-dimensionally by, for example, filtering first in the horizontal direction, then in the vertical direction, or vice versa.

A high-pass filter is a filter that retains small-scale variations and rejects large-scale variations. A low-pass fitter rejects small-scale variations and retains large-scale variations. Smoothing filter is a synonym for low-pass filter.

The cut-off frequency of a high-pass or low-pass filter indicates the scale that divides the retained variations from the rejected variations. A lower cut-off frequency corresponds to a larger scale of variations. Frequency actually refers to the variable $\omega$ in the Fourier transform $F(\omega)$ of the filter.

Generally speaking, the Fourier transform of a high-pass filter satisfies $F(0)=0$, while for a low-pass filter, $|F(0)|>0$. If $|F(0)|=1$, a low-pass filter can retain large-scale variations without changing their range of variation. Incidentally, $F(0)$ is the sum of the filter coefficients $f(k)$.

First Embodiment

Figure 1:
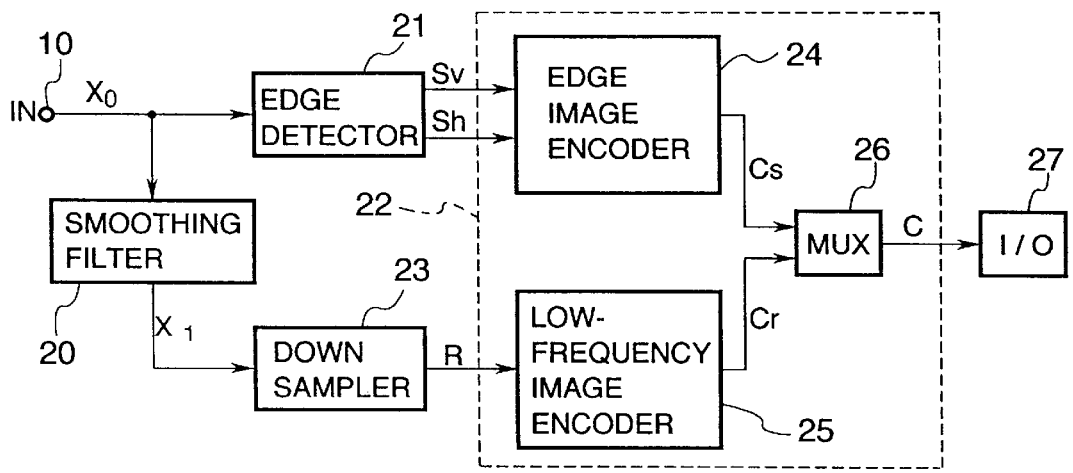
FIG. 1 is a block diagram of a digital image encoder in a first embodiment of the invention.

Referring to FIG. 1, the digital image encoder in the first embodiment comprises an input terminal 10, smoothing filter 20, edge detector 21, encoding section 22, and down sampler 23. The encoding section 22 comprises an edge image encoder 24, low-frequency image encoder 25, and multiplexer 26.

A digitized image $X_0$ is input from the input terminal to both the smoothing filter 20 and edge detector 21. The smoothing filter 20 outputs a low-frequency image $X_1$ to the down sampler 23, which outputs a reduced image R to the low-frequency image encoder 25 in the encoding section 22. The low-frequency image encoder 25 encodes the reduced image R to obtain low-frequency information Cr. The edge detector 21 detects edges in the input image $X_0$ and outputs horizontal and vertical edge images Sh and Sv to the edge image encoder 24 in the encoding section 22. The edge image encoder 24 encodes these edge images to obtain edge information Cs. The multiplexer 26 combines the low-frequency information Cr and edge information Cs into an encoded image C, which is output to a first input/output device 27 such as a communication channel, semiconductor memory, or magnetic disk storage device.

Figure 2:
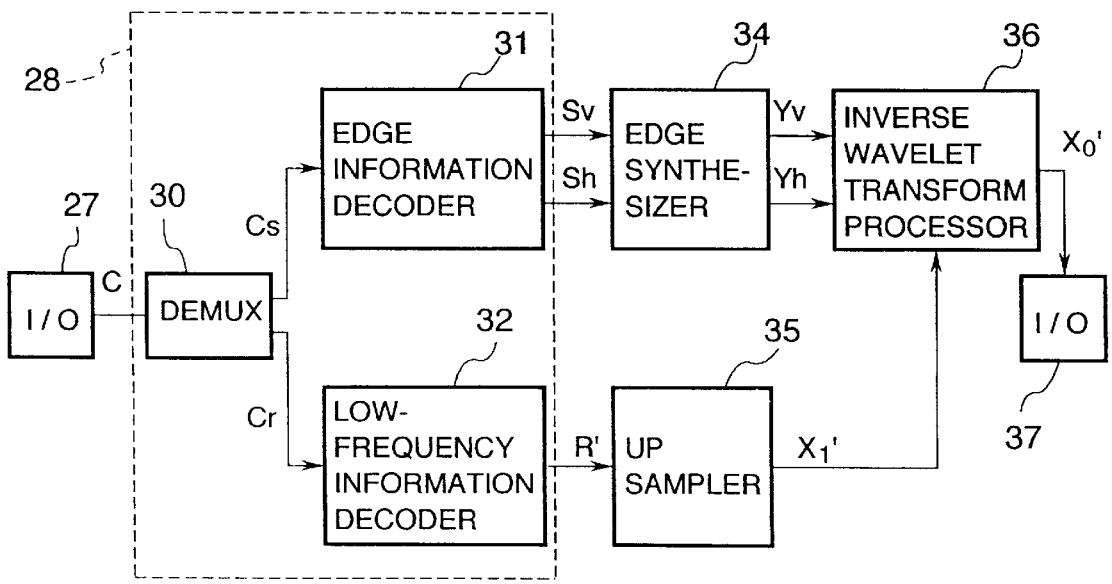
FIG. 2 is a block diagram of a digital image decoder in the first embodiment.

Referring to FIG. 2, the digital image decoder has a decoding section 28 comprising a demultiplexer 30, edge information decoder 31, and low-frequency information decoder 32. The digital image decoder also has an edge synthesizer 34, up sampler 35, and inverse wavelet transform processor 36.

The demultiplexer 30 receives the encoded image C from the first input/output device 27 and separates it into edge information Cs, which it supplies to the edge information decoder 31, and low-frequency information Cr, which it supplies to the low-frequency information decoder 32. The edge information decoder 31 decodes Cs to obtain the edge images Sh and Sv, from which the edge synthesizer 34 synthesizes horizontal and vertical high-frequency images Yh and Yv. The low-frequency information decoder 32 decodes Cr to obtain a decoded reduced image R', which the up sampler enlarges to obtain a decoded low-frequency image $X_1'$. The inverse wavelet transform processor 36 receives the high-frequency images Yh and Yv from the edge synthesizer 34 and the low-frequency image $X_1'$ from the up sampler 35, carries out an inverse wavelet transform, and outputs a reconstructed image $X_0'$ to an input/output device 37 such as a video display unit or printer.

Each of the elements in the FIGS. 1 and 2 comprises a memory for storing data and well-known circuits for performing arithmetic and logic operations. Descriptions of the circuit configurations will be omitted to avoid obscuring the invention with irrelevant detail. The entire digital image encoder can be fabricated as a single semiconductor integrated circuit, or can be built from a small number of such circuits; likewise the digital image decoder. The invention can also be practiced by providing a general-purpose processor such as a microprocessor or digital signal processor with memory for storing data and programs for executing the functions of the individual elements in FIG. 1 or FIG. 2.

Next, the operation will be described, starting with the operation of the encoder in FIG. 1.

The input image $X_0$ is a digitized image with pixel values $X_0(i, j)$. The smoothing filter 20 is a low-pass filter with even symmetry around zero and an odd number of taps. The tap coefficients will be denoted $h_o(k)$, where k ranges from $-N$ to $N$, so the filter has $2N+1$ taps and the even symmetry condition is:

$$h_o(-k)=h_o(k)(k=1, 2, \ldots, N)$$

The low-pass filter $h_o$ satisfies the exact reconstruction condition, and the sum of its tap coefficients is plus or minus one. That is, its Fourier transform $H_o$ satisfies the following conditions:

$$|H_o(\omega)|^2+|H_o(\omega+\pi)|^2=1$$

$$|H_o(0)|=1$$

The smoothing filter 20 performs a two-dimensional low-pass filtering operation by filtering the input image $X_0$ with ho horizontally and vertically, obtaining:

$$X_1(i, j) = \sum_{k=-N}^{N} \sum_{l=-N}^{N} X_0(i+k, j+1) \cdot h_O(k) \cdot h_O(l)$$

The down sampler 23 down-samples the low-frequency image $X_1$ output by the smoothing filter 20, thereby reducing the amount of image data. One simple method of down-sampling is to divide the image into blocks of M'M pixels each, and replace each block by a representative pixel value such as the mean or median value in the block. This reduces the size of the image by a factor of M in both the horizontal and vertical directions, and reduces the amount of image data by a factor of $M^2$. The reduced image R output by the down sampler 23 resembles a photographic reduction of the original image $X_0$.

The low-frequency image encoder 25 encodes the reduced image R by, for example, performing a discrete cosine transform, quantizing the resulting DCT coefficients, and encoding them in zig-zag order by a variable-length encoding method. Alternatively, the reduced image R can be encoded by a predictive encoding method similar to the differential pulse-code modulation method (DPCM) commonly employed for audio signals, or by any other suitable method. If the above value of M is sufficiently large, high coding efficiency is not critically important, because the amount of data to be encoded has already been greatly reduced by down-sampling.

The edge detector 21 detects edges in the input image $X_0$ by detecting variations in the rate of change of pixel values from pixel to pixel. More specifically, edge detector 21 takes differences between adjacent pixel values, then takes differences between these differences, and finally performs a thresholding operation to reduce small differences to zero. This process is carried out separately in the horizontal and vertical directions.

In the horizontal direction, for each pixel, the edge detector 21 computes the following pixel difference Pdh(i, j):

$$Pdh(i, j) = X_0(i-1, j)$$

Next it computes differences Sh(i, j) of these pixel differences Pdh(i, j) as follows:

$$Sh(i, j) = Pdh(i+1, j) - Pdh(i, j)$$
$$= X_0(i+1, j) - 2X_0(i, j) + X_0(i-1, j)$$

Equivalent edge detection could be performed by filtering the image $X_0$ with a second-derivative filter having coefficients (1, −2, 1), but taking differences of differences is preferable because it requires less computation.

The detected value Sh(i, j) is the edge sharpness at pixel (i, j), also referred to as the edge size. Edge sharpness values with absolute values equal to or less than a certain threshold value T are quantized to zero. Values exceeding T are also quantized, to reduce the number of bits in the edge-image data; then the quantized sharpness values Sh(i, j) at all pixels are output as the horizontal edge image Sh. Non-zero pixels in the edge image, i.e. pixels at which |Sh(i, j)|>T, are referred to as edge points.

The meaning of the edge sharpness computation can be seen in FIG. 3. The horizontal axis represents, for example, the horizontal direction in the image, and the vertical axis represents the pixel value. The difference between pixel values 38 and 39 is −A, the difference between pixel values 40 and 38 is B, and the difference between these differences is B−(−A)=A+B. If A+B>T, then pixel 38 is an edge point with sharpness A+B. The other pixels in FIG. 3 have zero sharpness. FIG. 3 thus illustrates a standard edge, with just one sharp variation.

FIG. 4 shows another standard edge, with non-zero sharpness at a single pixel 41. The size of the sharpness is Θ, the difference to the left of pixel 41 being zero. FIGS. 3 and 4 are drawn so that Θ=A+B, and edge points 38 and 41 have the same sharpness, or size.

Figure 5:
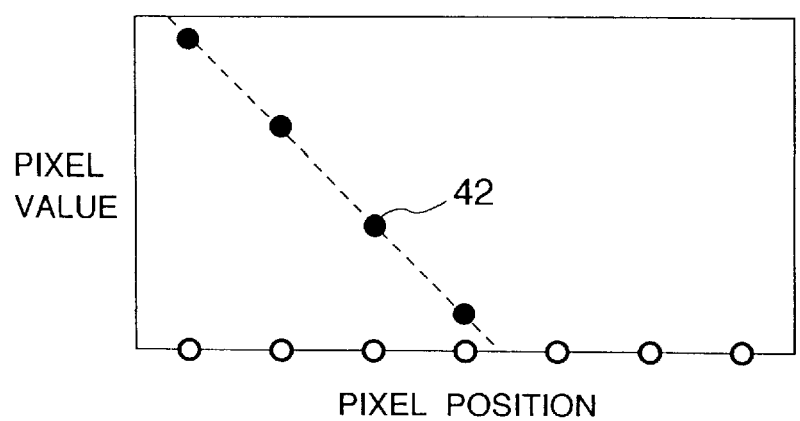
FIG. 5 is a graph illustrating pixels that do not form an edge.

In FIG. 5, pixel 42 is not an edge point. The differences on both sides of this pixel are the same, so the edge sharpness is zero. FIG. 5 represents an area in which, for example, intensity is shading from light to dark at a regular rate with no sharp change in this rate at any point. Incidentally, FIG. 5 represents the difference between FIGS. 3 and 4.

The vertical edge image is generated in the same way, by taking differences in the vertical direction, then taking differences of these differences. The edge sharpness Sv in the vertical direction is:

$$Sv(i, j) = X_0(i, j+1) - 2X_0(i, j) + X_0(i, j-1)$$

The vertical edge image is quantized as was the horizontal edge image, points for which |Sv(i, j)|≦T being set to zero.

Quantization can be performed by dividing the edge sharpness values by a power of two, for example, or by using a quantization table. Incidentally, the same notation Sh and Sv will be employed herein to denote edge sharpness values both before and after quantization.

The edge image encoder 24 encodes the quantized horizontal and vertical edge images Sh and Sv by using, for example, run-length encoding to encode the positions of edge points, and differential encoding to encode the sharpness values at these points. Alternatively, chain encoding can be used to encode the edge positions, taking advantage of the fact that edge points tend to be organized into chains of mutually contiguous points. Chain encoding encodes only the displacement from one position to the next in such a chain.

The encoded image C, consisting of the edge information Cs and low-frequency information Cr as multiplexed by the multiplexer 26, is output to the first input/output device 27 for transmission or storage. The amount of encoded data is generally reduced to a small fraction of the amount in the original image $X_0$, so the encoded image C can be efficiently transmitted or stored.

Next the decoding operations will be described. These operations employ further filters $e_o$, $f_o$, and $g_o$.

Filter $g_o$ is a high-pass filter having even symmetry and 2N+1 taps, related to the smoothing filter $h_o$ as follows:

$$g_o(k) = (-1)^k h_o(-k)$$

This relation implies that the Fourier transform $G_o$ of $g_o$ is the complex conjugate of $H_o(\omega+\pi)$, so $h_o$ and $g_o$ satisfy the exact reconstruction condition and form a complementary pair. Furthermore, $G_o(\omega+\pi)$ is the complex conjugate of $H(\omega)$, so $g_o$ also satisfies an exact reconstruction condition by itself:

$$|H_o(\omega)|^2 + |G_o(\omega)|^2 = 1$$

$$|G_o(\omega)|^2 + |G_o(\omega+\pi)|^2 = 1$$

Since $|H_o(0)|=1$, it follows that $|G_o(0)|=0$, so the sum of the tap coefficients $g_o(k)$ is zero.

The above properties of $g_o$ imply that when a uniform gradation of the type shown in FIG. 5 is filtered by $g_o$, the result will be uniformly zero. Consequently, if a standard edge of the type shown in FIG. 3 or 4 is filtered by $g_o$, the result will depend only on the edge sharpness. For example, FIGS. 3 and 4 give the same result when filtered by $g_o$. Moreover, this result has only 2N −1 non-zero values, occurring in the vicinity of the edge point.

Filter $e_o$ is an edge synthesis filter derived by filtering a standard edge of unit sharpness (for example, the edge in FIG. 4 with Θ=1) by $g_o$. The result is:

$$e(t) = e(-t) = \sum_{k=t}^{N} (k-t) \cdot g_0(k) \quad \text{if } 0 \leq t < N$$

$$e(t) = e(-t) = 0 \quad \text{if } t \geq N$$

Filter $f_o$ is a completion filter, defined in terms of its Fourier transform $F_o$ as follows.

$$F_O(\omega) = \frac{1 + |H_O(\omega)|^2}{2}$$

Filter $f_o$ is obtained by executing an inverse Fourier transform on $F_o$. Like $h_o$ and $g_o$, filter $f_o$ has even symmetry and 2N+1 taps. The above definition of $F_o$, incidentally, is well known in the wavelet transform art and comes from the following equation:

$$|H(\omega)|^4 + 2 \cdot F(\omega) \cdot |G(\omega)|^2 = 1$$

Referring again to FIG. 2, after the demultiplexer 30 separates the input encoded image C into edge information Cs and low-frequency information Cr, decoders 31 and 32 carry out processes that are reverse to the processes performed by encoders 24 and 25 in FIG. 1. For example, if the low-frequency image encoder 25 in FIG. 1 performed a discrete cosine transform followed by quantization and variable-length encoding, the low-frequency information decoder 32 in FIG. 2 performs variable-length decoding, dequantization, then an inverse discrete cosine transform to obtain the decoded reduced image R'.

If the edge images were encoded by run-length or chain encoding of the positions of the edge points and differential encoding of their sharpness, the edge information decoder 31 performs run-length or chain decoding to recover the edge positions and an accumulation process to obtain the sharpness values. The edge information decoder 31 also dequantizes the sharpness values.

The up sampler 35 obtains the decoded low-frequency image $X_1$ by restoring the decoded reduced image R' to the original image size (the size of the edge images and high-frequency images). If, for example, each pixel value in the reduced image R represented an M×M block in the low-frequency image $X_1$, the up sampler 35 can simply copy this value to all pixels in the corresponding M×M block of the decoded low-frequency image $X_1'$. More sophisticated up-sampling methods involving interpolation can also be employed, but smooth interpolation is not required, because the image will be smoothed during the inverse wavelet transform.

The edge synthesizer 34 filters the horizontal edge image Sh by the edge synthesis filter e(t) in the horizontal direction, and the vertical edge image Sv by e(t) in the vertical direction. The resulting horizontal and vertical high-frequency images Yh and Yv can be described by the following equations:

$$Yh(i, j) = \sum_{t=1-N}^{N-1} Sh(i+t, j) \cdot e(t)$$

$$Yv(i, j) = \sum_{t=1-N}^{N-1} Sv(i, j+t) \cdot e(t)$$

Conceptually, for each edge point, the edge synthesizer 34 synthesizes the result of filtering a standard edge of the corresponding sharpness by the high-frequency filter $g_o$. It then adds these results together for all edge points to synthesize a high-frequency image.

The inverse wavelet transform processor 36 performs three two-dimensional filtering operations: it filters the decoded low-frequency image $X_1'$ by $h_o$ horizontally and vertically; filters the horizontal high-frequency image Yh by $g_o$ horizontally and $f_o$ vertically; and filters the vertical high-frequency image Yv by $g_o$ vertically and $f_o$ horizontally. The three results are added to obtain the reconstructed image $X_0'$. This inverse wavelet transform is well known in the art, and is described by the following equation:

$$X_0'(i, j) = \sum_{k=-N}^{N} \sum_{l=-N}^{N} X_1'(i+k, j+l) \cdot h_o(k) \cdot h_o(l) +$$
$$\sum_{k=-N}^{N} \sum_{l=-N}^{N} Yh(i+k, j+l) \cdot g_o(k) \cdot f_o(l) +$$
$$\sum_{k=-N}^{N} \sum_{l=-N}^{N} Yv(i+k, j+l) \cdot g_o(l) \cdot f_o(k)$$

The reconstructed image $X_0'$ is output to the second input/output device 37 for display or print-out. Alternatively, the reconstructed image can be output to a computer for further image processing.

Synthesizing high-frequency image information from edge images as described above enables high compression ratios to be obtained. High-frequency information corresponding to edges below the sharpness threshold T is lost, so there is some loss of low-level, high-frequency shading variations, but the reconstructed image is not distorted, and sharp edges are faithfully preserved. Moreover, the high-frequency information is synthesized in a single, simple filtering step, without recourse to iterative procedures of uncertain reliability.

Second Embodiment

The second embodiment is similar to the first, but uses filters with an even instead of an odd number of taps, so the high-pass filter has odd symmetry, and the edge synthesis procedure is modified accordingly.

The digital image encoder of the second embodiment is identical to the digital image encoder in FIG. 1, except that the smoothing filter 20 employs a filter $h_e$ with 2N taps. This filter has even symmetry around ½:

$$h_e(1-k) = h_e(k) (k=1,2,\ldots,N)$$

The Fourier transform $H_e$ of this filter satisfies the same conditions as in the first embodiment:

$$|H_e(0)| = 1$$

$$|H_e(\omega)|^2 + |H_e(\omega+\pi)|^2 = 1$$

The smoothing filter 20 obtains the low-frequency image $X_1$ by filtering the input image $X_0$ by $h_e$ in the horizontal and vertical directions, as follows:

$$X_1(i, j) = \sum_{k=1-N}^{N} \sum_{l=1-N}^{N} X_0(i+k, j+l) \cdot h_o(k) \cdot h_o(l)$$

The digital image decoder is identical to the decoder in FIG. 2, except for the operation of the edge synthesizer 34 and inverse wavelet transform processor 36. The decoding description will be restricted to the operation of these elements.

The second embodiment employs a high-pass filter $g_e$ with 2N taps, obtained from the smoothing filter $h_e$ by the same relation as in the first embodiment:

$$g_e(k) = (-1)^k h_e(-k) (k=-N\ldots,N-1)$$

Whereas the filter $g_o$ had even symmetry around zero, $g_e$ has odd symmetry around −½:

$$g_e(-k) = -g_e(k-1) (k=1,2,\ldots,N)$$

As before, the Fourier transform $G_e(\omega)$ of $g_e$ is the complex conjugate of $H_e(\omega+\pi)$, and filters $h_e$ and $g_e$ form a complementary pair:

$$|H_e(\omega)|^2 + |G_e(\omega)|^2 = 1$$

The edge synthesizer 34 in the second embodiment filters the decoded edge images Sv and Sh by an edge synthesis filter obtained by filtering a standard edge with the high-pass filter $g_e$. This process could be carried out directly, as in the first embodiment, but in that case the following computational problem would arise.

When a uniform gradation as in FIG. 5 is filtered by $g_e$, the result has a constant value at every point, but this value is not in general zero. Accordingly, the results of filtering the standard edges in FIGS. 3 and 4 with $g_e$ need not be the same. More significantly, their non-zero values will not necessarily be limited to the vicinity of the edge point, so direct filtering by an edge synthesis filter as in the first embodiment would require much computation.

If the differences between adjacent coefficient values in the edge synthesis filter are taken, however, these differences have the desirable properties of depending only on the edge sharpness, and being zero outside the vicinity of the edge point. Accordingly, the edge synthesizer 34 in the second embodiment is preferably configured as in FIG. 6, comprising a horizontal differential edge synthesizer 44, vertical differential edge synthesizer 45, horizontal accumulator 46, and vertical accumulator 47. The horizontal and vertical differential edge synthesizers 44 and 45 employ a differential edge synthesis filter with coefficients de(t) obtained by filtering a standard edge of unit sharpness with the high-pass filter $g_e$, then taking differences between the resulting vallies at adjacent pixels. Specifically, $$de(t) = de(-t) = \sum_{k=t}^{N-1} g_e(k) \quad \text{if } 0 \le t < N$$

$$de(t) = de(-t) = 0 \quad \text{if } t \ge N$$

Whereas the high-pass and low-pass filters $g_e$ and $h_e$ have an even number (2N) of taps, the differential edge synthesis filter de has an odd number (2N–1) of taps.

The horizontal differential edge synthesizer 44 filters the horizontal edge image Sh horizontally by de(t) to obtain a horizontal differential high-frequency image Δ Yh. The vertical differential edge synthesizer 45 filters the vertical edge image Sv vertically with de(t) to obtain a vertical differential high-frequency image Δ Yv. These differential high-frequency images are described by the following equations:

$$\Delta Yh(i, j) = \sum_{t=1-N}^{N-1} Sh(i+t, j) \cdot de(t)$$

$$\Delta Yv(i, j) = \sum_{t=1-N}^{N-1} Sv(i, j+t) \cdot de(t)$$

The horizontal and vertical accumulators 46 and 47 then complete the edge synthesis filtering operation and generate the horizontal and vertical. highl-frequency images Yh and Yv by performing accumulation operations on Δ Yh and Δ Yv in the horizontal and vertical directions, respectively. If the horizontal and vertical coordinates i and j both start at zero, these accumulation operations can be described as follows:

$$Yh(i, j) = \sum_{k=0}^{i} \Delta Yh(k, j)$$

$$Yv(i, j) = \sum_{k=0}^{j} \Delta Yv(i, k)$$

The digital image decoder also employs a completion filter $f_e$ defined by its Fourier transform $F_e$ in the same way as in the first embodiment:

$$F_e(\omega) = \frac{1 + |H_e(\omega)|^2}{2}$$

The inverse wavelet transform processor 36 in the second embodiment uses the conjugates $f^*_e$, $g^*_e$, and $h^*_e$ of filters $f_e$, $g_e$, and $h_e$, defined as explained earlier, e.g. $h_e^*(-k) = h_e(k)$. The inverse wavelet transform processor 36 filters the decoded low-frequency image $X_1'$ by $h^*_e$ horizontally and vertically, filters the horizontal high-frequency image Yh by $g^*_e$ horizontally and $f^*_e$ vertically, filters the vertical high-frequency image Yv by $g^*_e$ vertically and $f^*_e$ horizontally, arid adds the three results to obtain the reconstructed image $X_0'$, as follows:

$$X_0'(i, j) = \sum_{k=-N}^{N-1} \sum_{l=-N}^{N-1} X_1'(i+k, j+l) \cdot h_e^*(k) \cdot h_e^*(l) +$$

$$\sum_{k=-N}^{N} \sum_{l=-N}^{N-1} Yh(i+k, j+l) \cdot g_e^*(k) \cdot f_e^*(l) +$$

$$\sum_{k=-N}^{N-1} \sum_{l=-N}^{N} Yv(i+k, j+l) \cdot g_e^*(l) \cdot f_e^*(k)$$

The inverse wavelet transforms employed in the first and second embodiments are essentially the same, because the even filters employed in the first embodiment are equal to their own conjugates.

The difference being using filters with an odd number of taps as in the first embodiment and an even number of taps as in the second embodiment is mainly computational. In terms of image encoding and reconstruction, both embodiments provide similar effects.

Third Embodiment

The third embodiment is similar to the first embodiment, but the smoothing and inverse wavelet transform operations are cascaded over n wavelet scales, where n is an arbitrary integer greater than one, with edge detection and edge synthesis performed at each scale.

Figure 7:
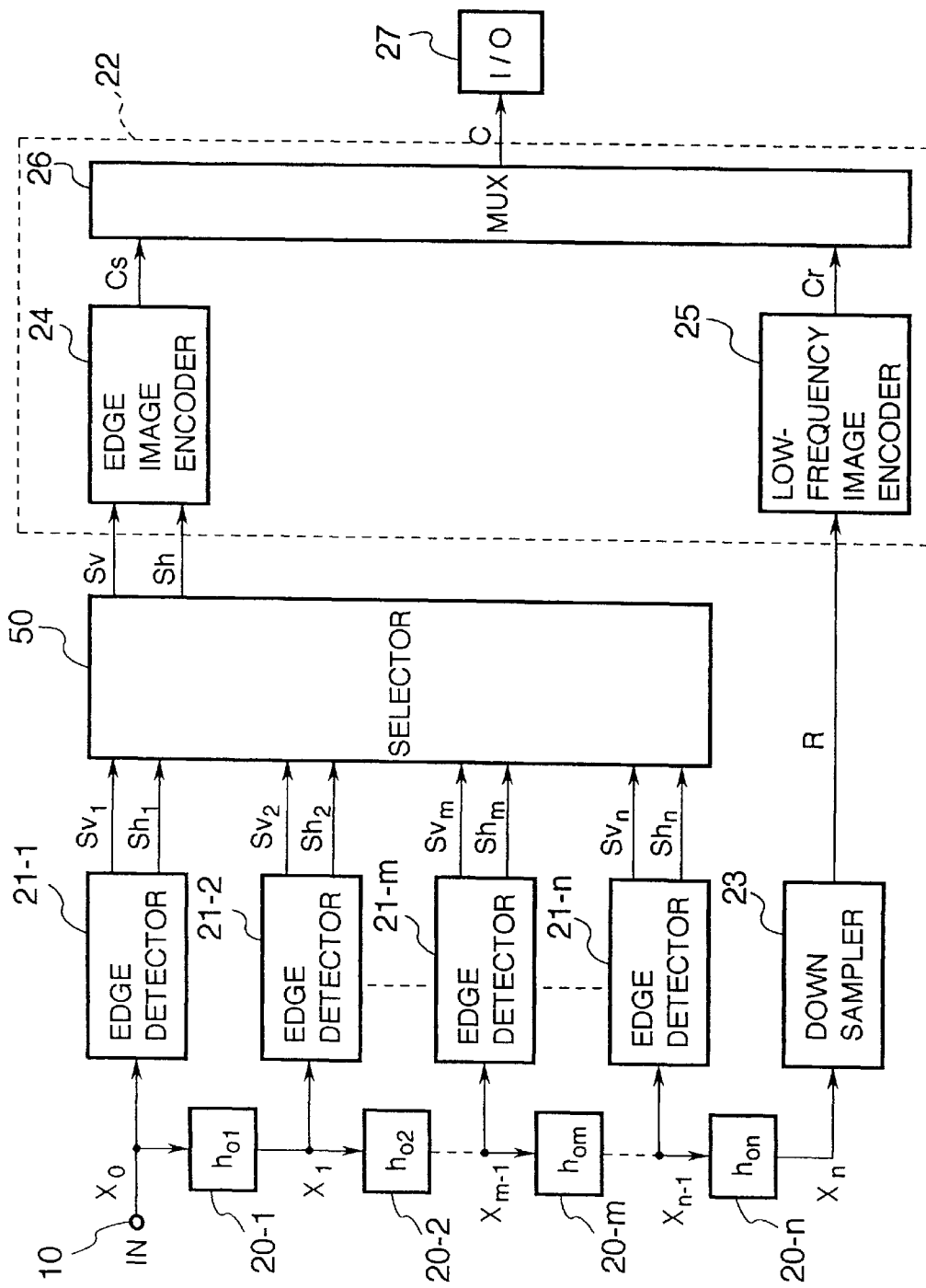
FIG. 7 is a block diagram of the digital image encoder in a third embodiment of the invention.

Referring to FIG. 7, the digital image encoder in the third embodiment comprises n cascaded smoothing filters 20-1 to 20-n, n edge detectors 21-1 to 21-n, and a selector 50. It also comprises the same encoding section 22 and down sampler 23 as in the first embodiment in FIG. 1, the encoding section 22 having the same encoders 24 and 25 and multiplexer 26.

The image $X_0$ input at the input terminal 10 is supplied to the first smoothing filter 20-1 and edge detector 21-1. Each smoothing filter 20-min the cascade (m=1 to n–1) outputs a filtered image $X_m$, to the next smoothing filter 20-(m +1) and next edge detector 21-(m+1). The last smoothing filter 20-n outputs a low-frequency image $X_n$ to the down sampler 23.

The edge detectors 21-m are all identical to the edge detector 21 in FIG. 1. Each produces a pair of horizontal and vertical edge images $Sh_m$ and $Sv_m$, which are input to the selector 50. The selector 50 selects one of these pairs of edge images, and supplies the selected pair Sh and Sv to the edge image encoder 24.

Figure 8:
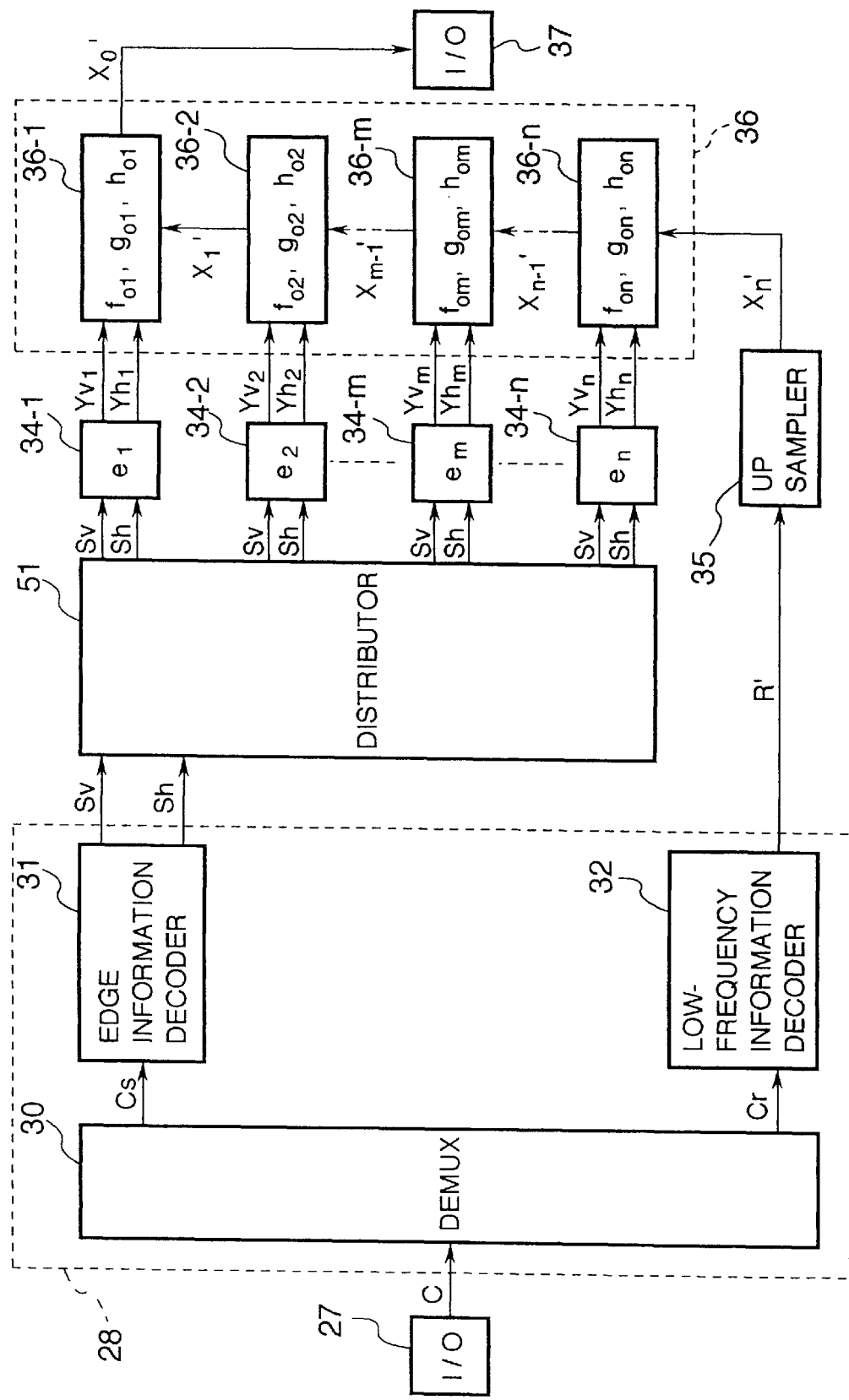
FIG. 8 is a block diagram of the (digital image decoder in the third embodiment.

Referring to FIG. 8, the digital image decoder in the third embodiment comprises the same decoding section 28 and up sampler 35 as in the preceding embodiments, the decoding section 28 comprising the same demultiplexer 30 and decoders 31 and 32. The decoded low-frequency image output by the up sampler 35 is now denoted $X_n'$. The digital image decoder also comprises a distributor 51, n edge synthesizers 34-m (m=1 to n), and an inverse wavelet transform processor 36. The inverse wavelet transform processor 36 now consists of n cascaded inverse wavelet processors 36-m.

The distributor 51 distributes identical copies of the horizontal and vertical edge images Sh and Sv received from the edge information decoder 31 to all of the edge synthesizers 34-m (m=1 to n). Each edge synthesizer 34-m outputs a pair of horizontal and vertical high-frequency images $Yh_m$ and $Yv_m$ to the corresponding inverse wavelet processor 36-m. Each inverse wavelet processor 36-m (m=1 to n-1) also receives a partially reconstructed image $X_m$ from the preceding inverse wavelet processor 36-(m+1) in the cascade, and outputs a partially reconstructed image $X_{m-1}$ to the next inverse wavelet processor 36-(m-1). The first inverse wavelet processor 36-n in the cascade receives the decoded low-frequency image $X_n'$ from the up sampler 35. The last inverse wavelet processor 36-1 outputs the fully reconstructed image $X_0'$ to the input/output device 37.

Next, the operation of the third embodiment will be described, starting with the encoding operation.

Each of the smoothing filters 20-m in FIG. 7 employs a different set of filter coefficients $h_{om}(k)$. All of these filters have properties similar to the filter $h_o$ employed in the first embodiment: even symmetry, and an odd number of taps with coefficients summing to plus or minus one. The first filter $h_{o1}$ satisfies the exact reconstruction condition.

The cut-off frequency of each smoothing filter 20-m (m>1) is one-half the cut-off frequency of the preceding filter 20-(m-1) in the cascade. Filters with these cut-off frequencies can be obtained by doubling the tap spacing from one filter to the next. That is, $h_{om}$ can be obtained from $h_o(m-1)$ as follows:

$$h_{om}(2k)=h_{o(m-1)}(k)$$

$$h_{om}(2k+1)=0(k=0,\pm1,\pm2,\ldots)$$

In smoothing filter 20-m, image $X_{m-1}$ is filtered horizontally and vertically by filter $h_{om}$ to obtain image $X_m$. As the image passes through the cascade, variations on progressively larger scales are smoothed out, and resolution of fine detail decreases correspondingly.

Incidentally, if the low-pass filters $h_{om}$ (m>1) are obtained by doubling the tap spacing as described above, they will pass high-frequency variations in certain regions above their cut-off frequencies. This is allowable because those high-frequency variations will already have been removed by previous filters in the cascade.

Each edge detector 21-m detects edges in the received image $X_{m-1}$ by the difference-of-differences method described in the first embodiment. All of the edge detectors 21-m can use the same threshold T, or different thresholds can be employed in different edge detectors.

In selecting one of the pairs of horizontal and vertical edge images $Sh_m$ and $Sv_m$ (m=1 to n) produced by the edge detectors 21-m, the selector 50 may select according to statistics of the edge images themselves, such as the number of edge points detected, or according to an external command specifying a desired edge resolution. In general, edge images $Sh_m$ and $Sv_m$ obtained at lower resolutions (higher values of m) contain less information, but also contain less noise.

The operations of down-sampling, encoding the selected edge images Sh and Sv, encoding the reduced image R, and multiplexing the encoded data are carried out as in the first embodiment.

Next the decoding operations will be described. These operations employ edge synthesis filters $e_{om}$, completion filters $f_{om}$, and high-pass filters $g_{om}$ (m=1 to n). Filters $f_{om}$ and $g_{om}$ are related to respective smoothing filters $h_{om}$ (m=1 to n) in the same way that $f_o$ and $g_o$ were related to $h_o$ in the first embodiment. Specifically, $$F_{om}(\omega) = \frac{1+|H_{om}(\omega)|^2}{2}$$

Once $f_{o1}$ and $g_{o1}$ have been obtained from $h_{o1}$, the other filters $f_{om}$ and $g_{om}$ (m=2 to n) can be obtained by successively doubling the tap spacing, as was done for the low-pass filters $h_{om}$, so that the number of taps remains 2N+1 in each filter.

Each edge synthesis filter $e_{om}$ is obtained by filtering a standard edge of unit sharpness with the corresponding high-pass fitter $g_{om}$. The length of each edge synthesis filter $e_{om}$ (the distance between the two outermost taps) is still less by two than the length of the corresponding high-pass filter $g_{om}$, but $e_{om}$ may have more taps than $g_{om}$, because while $g_{om}$ may have many zero coefficients between the outermost two taps, $e_{om}$ in general will not.

The operations of demultiplexinig the encoded image C, decoding the edge information Cs, and decoding and up-sampling the low-frequency information Cr are carried out as in the first embodiment, producing a pair of edge images Sh and Sv and a decoded low-frequency image $X_n'$.

Each edge synthesizer 34-m (m=1 to n) filters the pair of edge images Sh and Sv by its edge synthesis filter $e_{om}$ to generate horizontal and vertical high-frequency images $Yh_m$ and $Yv_m$. Even though all edges were detected at a single selected resolution, the edge synthesizers 34-m synthesize high-frequency images at different resolutions from these same edges.

Each inverse wavelet processor 36-m generates the image $X_{m-1}'$ from images $X_m$, $Yh_m$, and $Yv_m$ in the same way that the inverse wavelet transform processor 36 in the first embodiment generated $X_0$ from $X_1$, Yh, and Yv. That is, it filters $X_m'$ horizontally and vertically by $h_{om}$, filters $Yh_m$ horizontally by $g_{om}$ and vertically by $f_{om}$, filters $Yv_m$ vertically by $g_{om}$ and horizontally by $f_{om}$, and sums the three results.

The compression ratios achieved by the third embodiment are comparable to those achieved by the first embodiment because the encoded information again comprises just one reduced low-frequency image and two edge images, but the third embodiment gives better reconstruction of images with high-frequency noise. In the first embodiment, such noise can only be dealt with by raising the edge sharpness threshold T, which is not always a satisfactory solution. In the third embodiment, edges can be detected in an image from which high-frequency noise has been removed by smoothing, so it is not necessary to raise the edge sharpness threshold.

Fourth Embodiment

The fourth embodiment differs from the third embodiment in that the digital image encoder selects a particular resolution before performing edge detection. The digital image decoder is the same as in the third embodiment.

Figure 9:
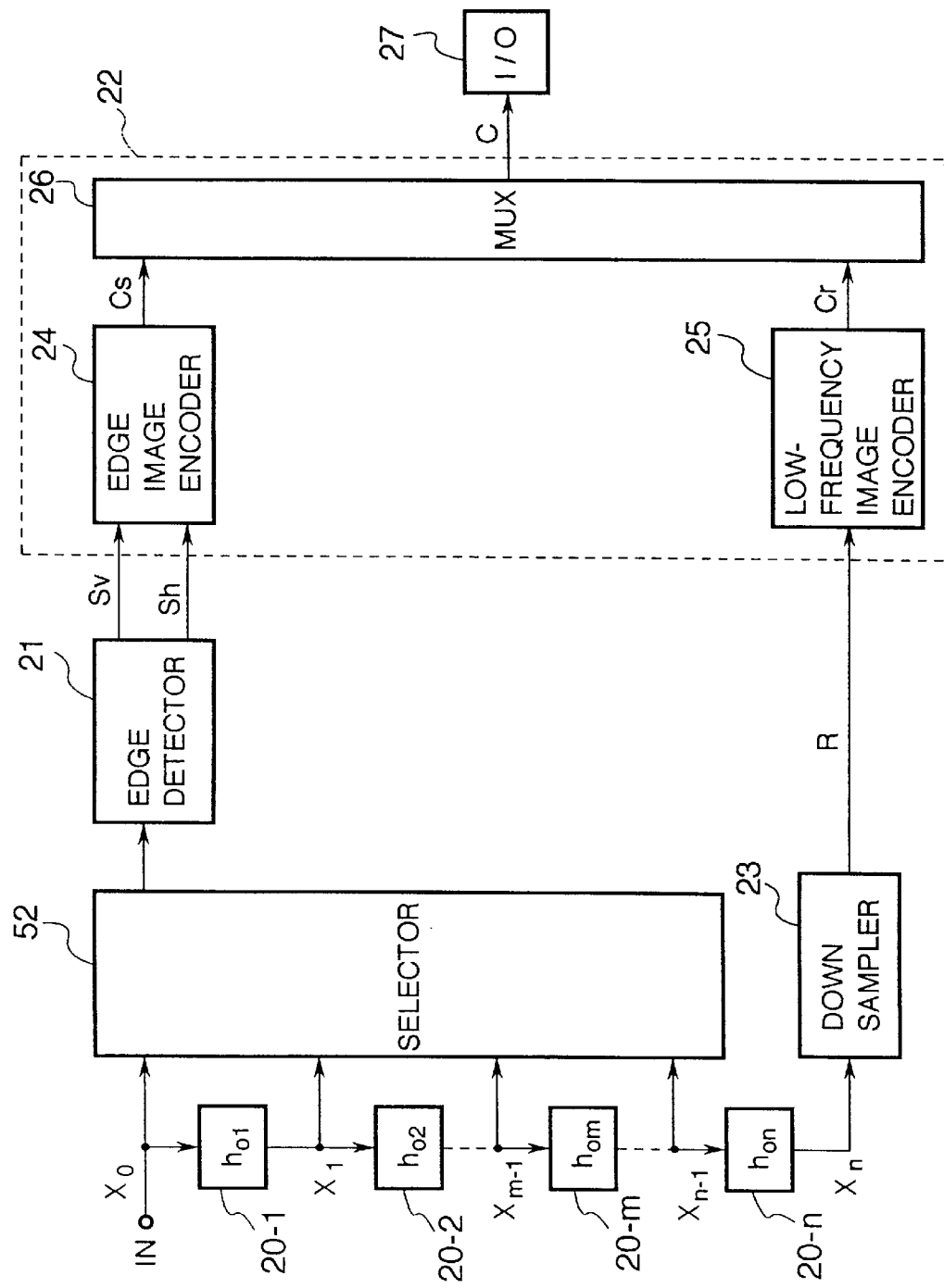
FIG. 9 is a block diagram of the digital image encoder in a fourth embodiment.

Referring to FIG. 9, the digital image encoder has smoothing filters 20-m (m=1 to n) that output filtered images $X_m$ as in the third embodiment. A selector 52 selects one of these images for input to an edge detector 21, which is identical to the edge detector 21 in the first embodiment. Other elements in FIG. 9 are also identical to corresponding elements in the first and third embodiments, and have the same reference numerals.

The selector 52 selects a particular image $X_m$ according to statistics taken from the images $X_m$ (m=1 to n), or according to an external command. The edge detector 21 detects edges in the selected image as in the first embodiment. Other than this difference, the fourth embodiment operates like the third embodiment, so further description will be omitted.

The fourth embodiment has the advantage of a simpler configuration than the third embodiment, and needless computation of edge images that will not be used is avoided. The selector 52 must, however, select a resolution before seeing the results of edge detection.

Fifth Embodiment

The fifth embodiment differs from the third embodiment in using filters with an even number of taps.

Figure 10:
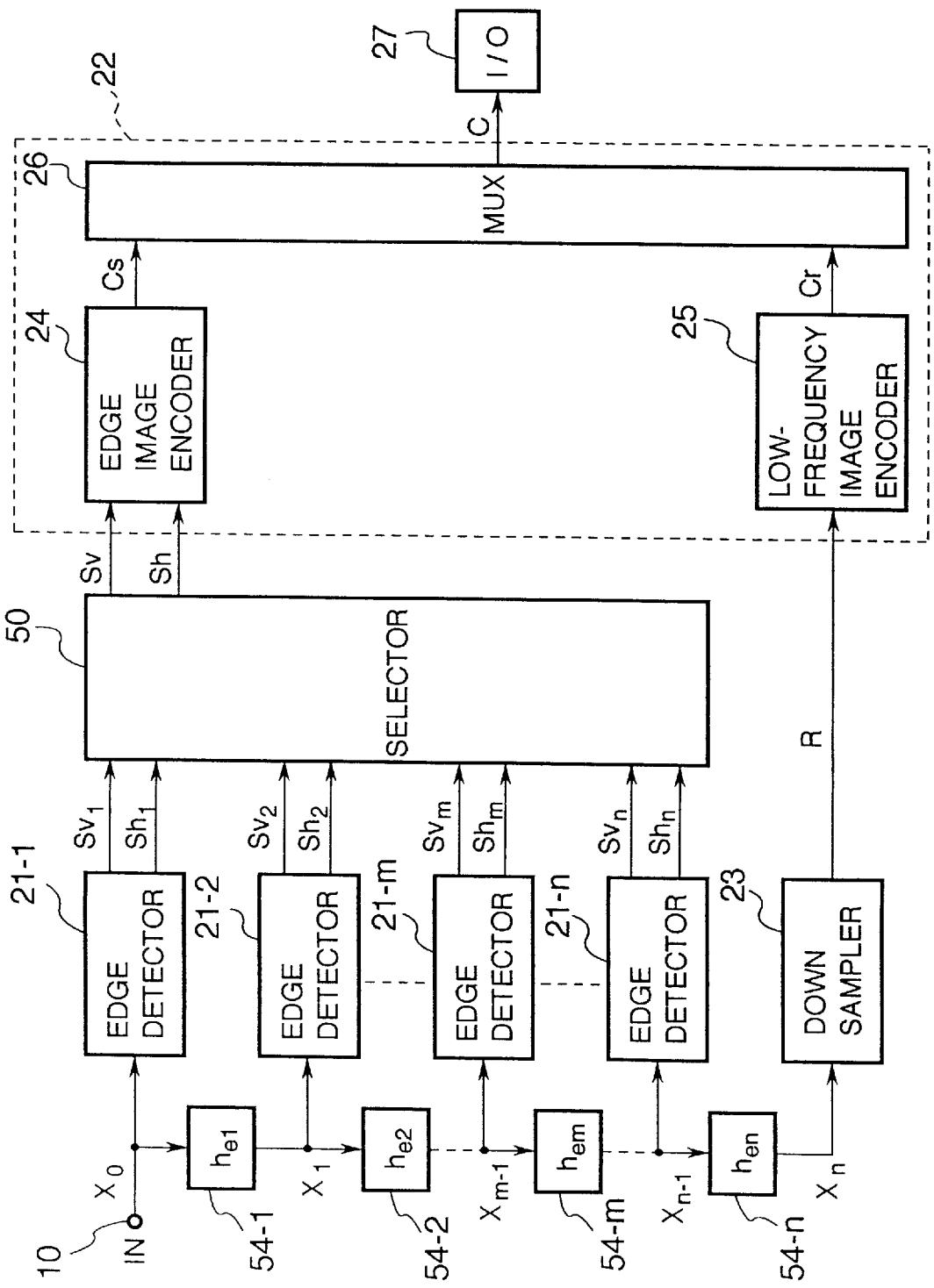
FIG. 10 is a block diagram of the digital image encoder in a fifth embodiment.

Referring to FIG. 10, the digital image encoder of the fifth embodiment has the same structure as in the third embodiment, and the same reference numerals are used as in FIG. 7 except for the cascaded smoothing filters 54-m, which employ different filter functions $h_{em}$ (m=1 to n).

The filters $h_{em}$ are similar to the filter $h_e$ in the second embodiment in being low-pass filters with even symmetry and an even number of taps. As in the third embodiment, each filter hem can be obtained from the preceding filter by doubling the spacing between taps, which reduces the cut-off frequency by a factor of two.

Other than the difference in the number of taps, the operation of the digital image encoders in the third and fifth embodiments is the same.

Figure 6:
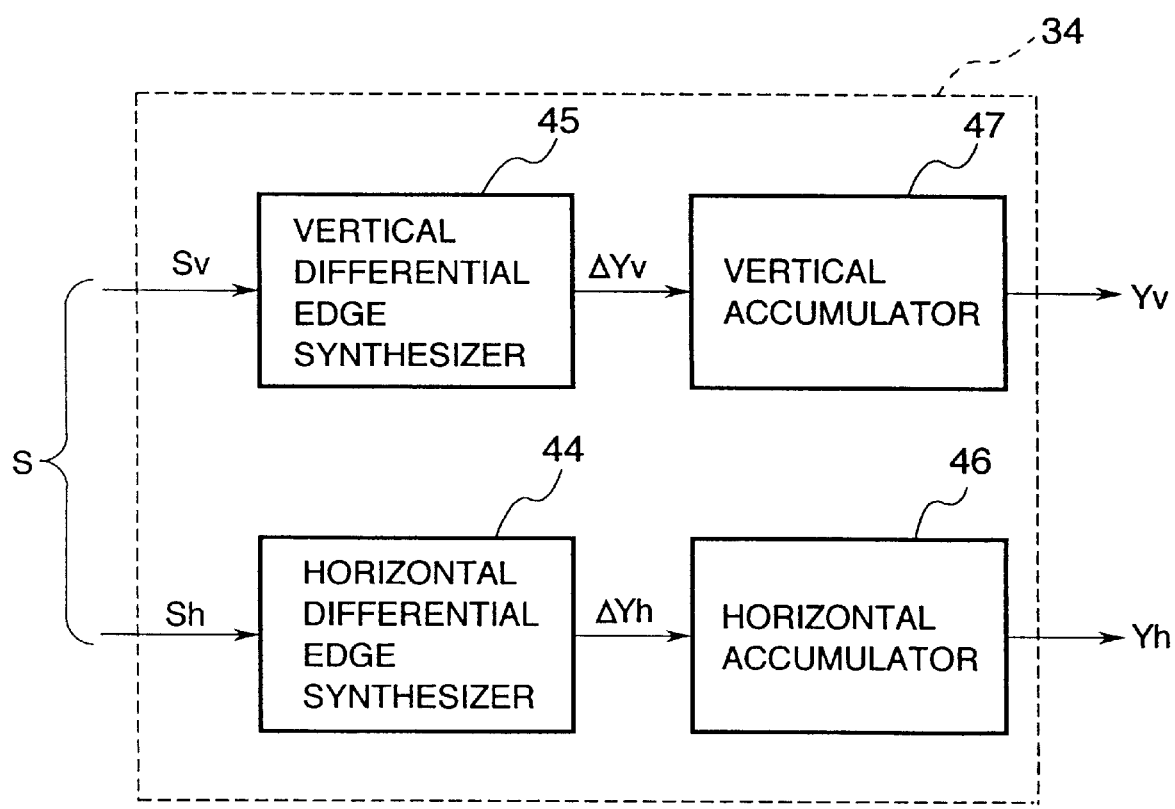
FIG. 6 is a block diagram of the edge synthesizer in a second embodiment of the invention.
Figure 11:
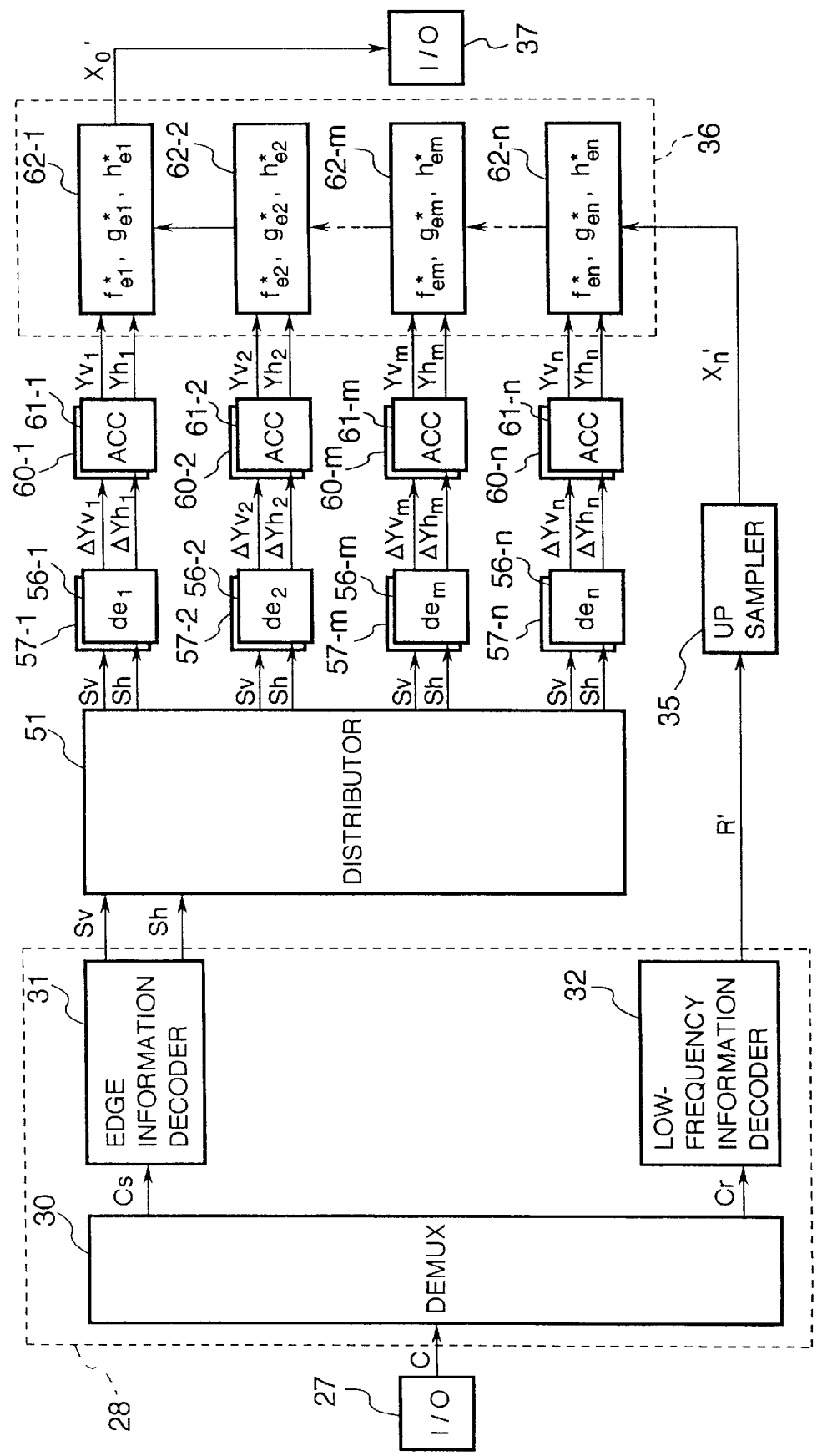
FIG. 11 is a block diagram of the digital image decoder in the fifth embodiment.

Referring to FIG. 11, the digital image decoder in the fifth embodiment is similar to the digital image decoder of the third embodiment (FIG. 8), except that the high-frequency images are generated by the method of FIG. 6. Elements that have the same reference numerals in FIGS. 11 and 8 are identical.

The distributor 51 in the fifth embodiment distributes the pair of edge images Sh and Sv to pairs of differential edge synthesizers 56-m and 57-m (m=1 to n), which are similar to the differential edge synthesizers 44 and 45 in FIG. 6. These output differential high-frequency images $\Delta Yh_m$ and $\Delta Yv_m$ to corresponding pairs of accumulators 60-m and 61-m, which are similar to the accumulators 46 and 47 in FIG. 6. The accumulators 60-m and 61-m output high-frequency images $Yh_m$ and $Yv_m$ to the inverse wavelet transform processor 36. The inverse wavelet transform processor 36 comprises inverse wavelet processors 62-n (m=1 to n) which are similar to the inverse wavelet processors 36-n in the third embodiment, except that they employ filters $f_{em}^*$, $g_{em}^*$, and $h_{em}^*$ with an even number of taps.

Filter $h_{em}^*$ is conjugate to the low-pass filter $h_{em}$ employed in the encoder. Filters $f_{em}^*$ and $g_{em}^*$ are related to $h_{em}^*$ in the same way that $f_o$ and $g_o$ were related to $h_o$ in the first embodiment. Specifically, the Fourier transforms $F_{em}^*$, $G_{em}^*$, and $H_{em}^*$ of these filters satisfy:

$$F_{em}^*(\omega) = \frac{1 + |H_{em}^*(\omega)|^2}{2}$$

Filter $f_{em}^*$ can be obtained from the above definitions of their Fourier transforms. Filters $g_{em}^*$ can be constructed as follows.

First, filters $f_{e1}$ and $g_{e1}$ are obtained from smoothing filter $h_{e1}$ in the same way that $f_e$ and $g_e$ were obtained from $h_e$ in the second embodiment:

$$g_{e1}(k) = (-1)^k h_{e1}(-k) (k=-N \ldots, N-1)$$

Each filter $g_{em}$ (m=2 to n) is then obtained from the preceding filter $g_e(m-1)$ by doubling the tap spacing. Each filter $g_{em}$ (m=1 to n) has odd symmetry. The order of taps of $g_{em}$ can be reversed to obtain the conjugate $g_{em}^*$.

The differential edge synthesizers 56-m and 57-m (m=1 to n) employ respective differential edge synthesis filters $de_m$ that are obtained from the above high-pass filters $g_{em}$ in the same way that the filter de was obtained from $g_e$ in the second embodiment: by filtering a standard edge of unit sharpness with $g_{em}$, then taking the differences between resulting coefficients.

The decoding section 28, up sampler 35, and distributor 51 operate as in the third embodiment. The differential edge synthesizers 56-m and 57-m (m=1 to n) operate like the differential edge synthesizers 44 and 45 in the second embodiment, filtering the pair of edge images Sh and Sv by their respective differential edge synthesis filters $de_m$. The accumulators 60-m and 61-m operate like the accumulators 46 and 47 in FIG. 6.

The inverse wavelet transform processor 36 operates as in the third embodiment. Each inverse wavelet processor 62-m generates image $X_{m-1}'$ from images $X_m'$, $Yh_m$, and $Yv_m$ by filtering $X_m'$ horizontally and vertically with $h_{em}^*$, filtering $Yh_m$ horizontally with $g_{em}^*$ and vertically with $f_{em}^*$, filtering $Yv_m$ vertically with $g_{em}^*$ and horizontally with $f_{em}^*$, and summing the three results.

The fifth embodiment has effects similar to the third embodiment.

Sixth Embodiment

The sixth embodiment differs from the fifth as the fourth embodiment differed from the third: the digital image encoder selects a particular resolution before performing edge detection. The digital image decoder is the same as in the fifth embodiment.

Figure 12:
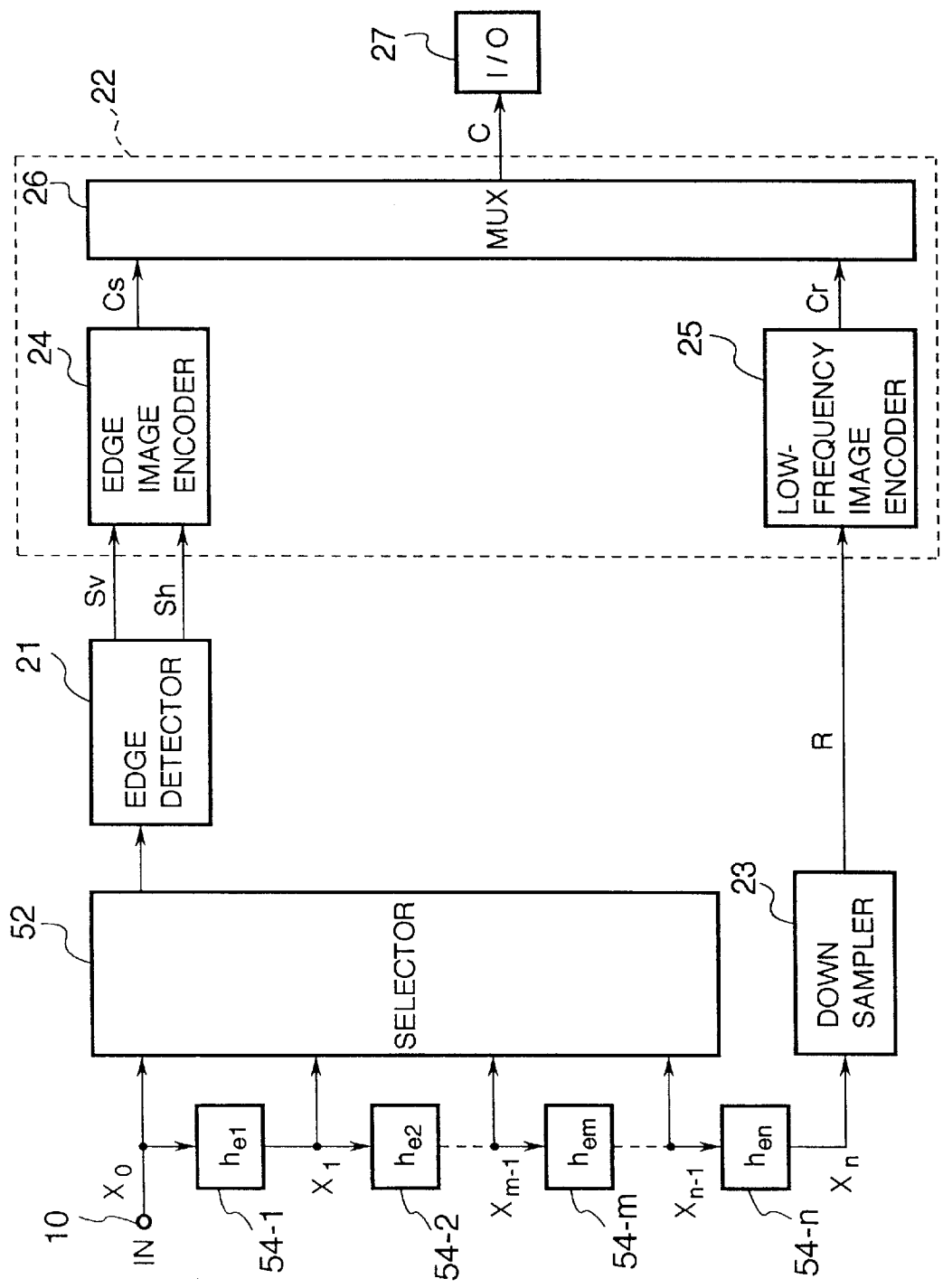
FIG. 12 is a block diagram of the digital image encoder in a sixth embodiment.

Referring to FIG. 12, the digital image encoder has the same smoothing filters 54-m (m=1 to n) as in the fifth embodiment, which output filtered images $X_m$. As in the fourth embodiment, a selector 52 selects one of the images $X_m$ (m=0 to n−1). The other elements in FIG. 12 also operate as in the fourth embodiment, being identical to elements in 9 with the same reference numerals.

Aside from the use of filters with an even number of taps, the sixth embodiment operates exactly like the fourth embodiment and provides the same effects, so further description will be omitted.

Seventh Embodiment

The seventh embodiment is similar to the third embodiment, but is adapted to process moving images comprising successive frames.

Figure 13:
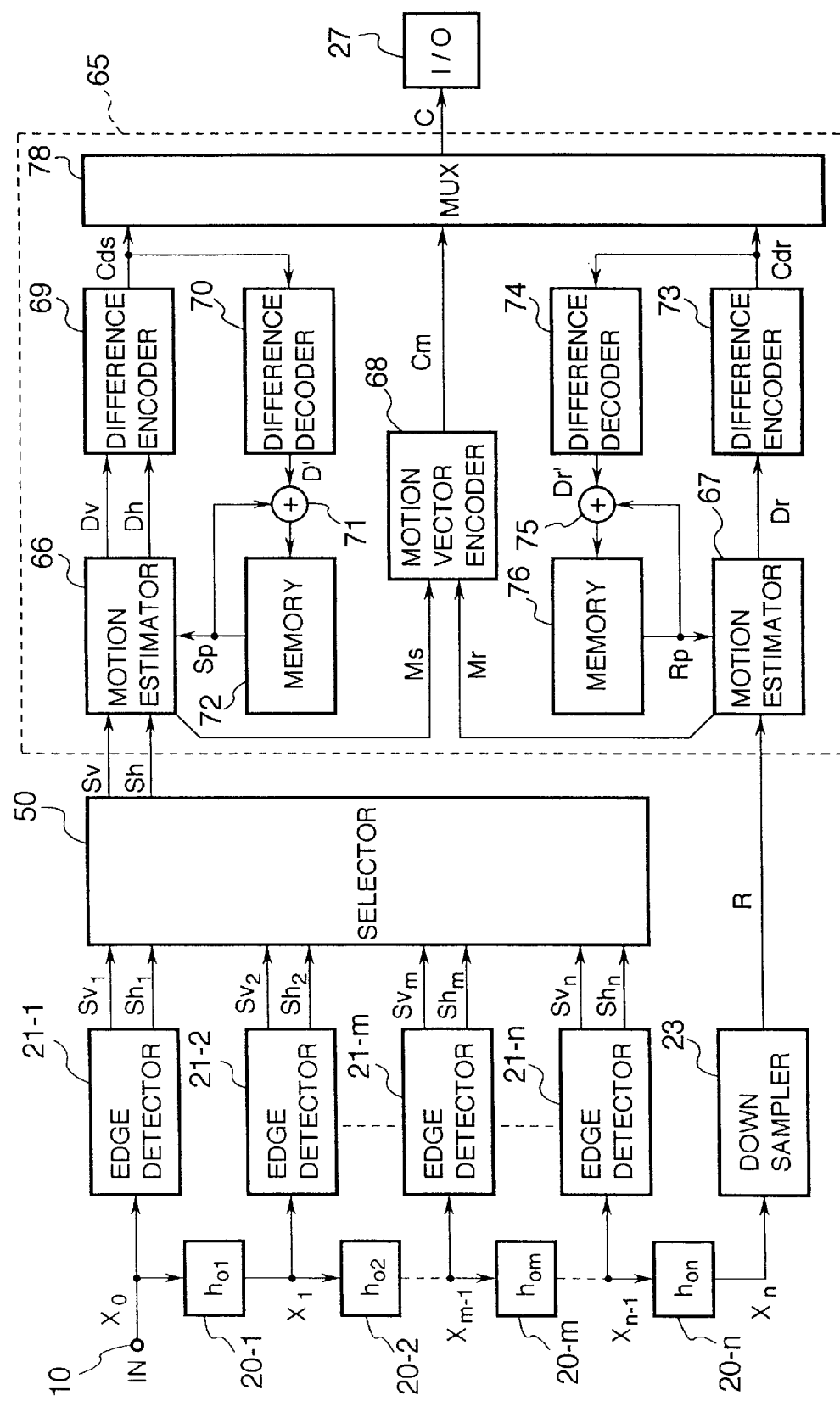
FIG. 13 is a block diagram of the digital image encoder in a seventh embodiment, for encoding moving images.

Referring to FIG. 13, the digital image encoder of the seventh embodiment has the same smoothing filters 20-m and edge detectors 21-m (m=1 to n) as the third embodiment, and the same down sampler 23 and selector 50. The encoding section 65, however, differs from the encoding section 22 in the third embodiment.

The encoding section 65 comprises a pair of motion estimators 66 and 67, a motion vector encoder 68, a pair of difference encoders 69 and 73, a pair of difference decoders 70 and 74, a pair of adders 71 and 75, and a pair of memories 72 and 76.

Motion estimator 66 receives the pair of edge images Sh and Sv from selector 50, and corresponding previous edge images Sp from memory 72. The symbol Sp in the drawing denotes a pair of images: a previous horizontal edge image and a previous vertical edge image. Motion estimator 66 outputs edge motion vectors Ms and a pair of horizontal and vertical edge difference images Dh and Dv. Motion estimator 67 receives the reduced image R from down sampler 23 and a previous reduced image Rp from memory 76, and outputs low-frequency motion vectors Mr and a reduced difference image Dr. The motion vector encoder 68 encodes motion vectors Ms and Mr and outputs motion information Cm.

Difference encoder 69 encodes the edge difference images Dh and Dv and outputs edge difference information Cds. This information is decoded by difference decoder 70 to produce a pair of decoded edge difference images, which are denoted in the drawing by the single symbol D'. Similarly, difference encoder 70 encodes the reduced difference image Dr and outputs low-frequency difference information Cdr. Difference decoder 74 decodes Cdr and outputs a decoded reduced difference image Dr'.

The multiplexer 78 multiplexes the edge difference information Cds, motion information Cm, and low-frequency difference information Cdr for output as an encoded image C.

Figure 14:
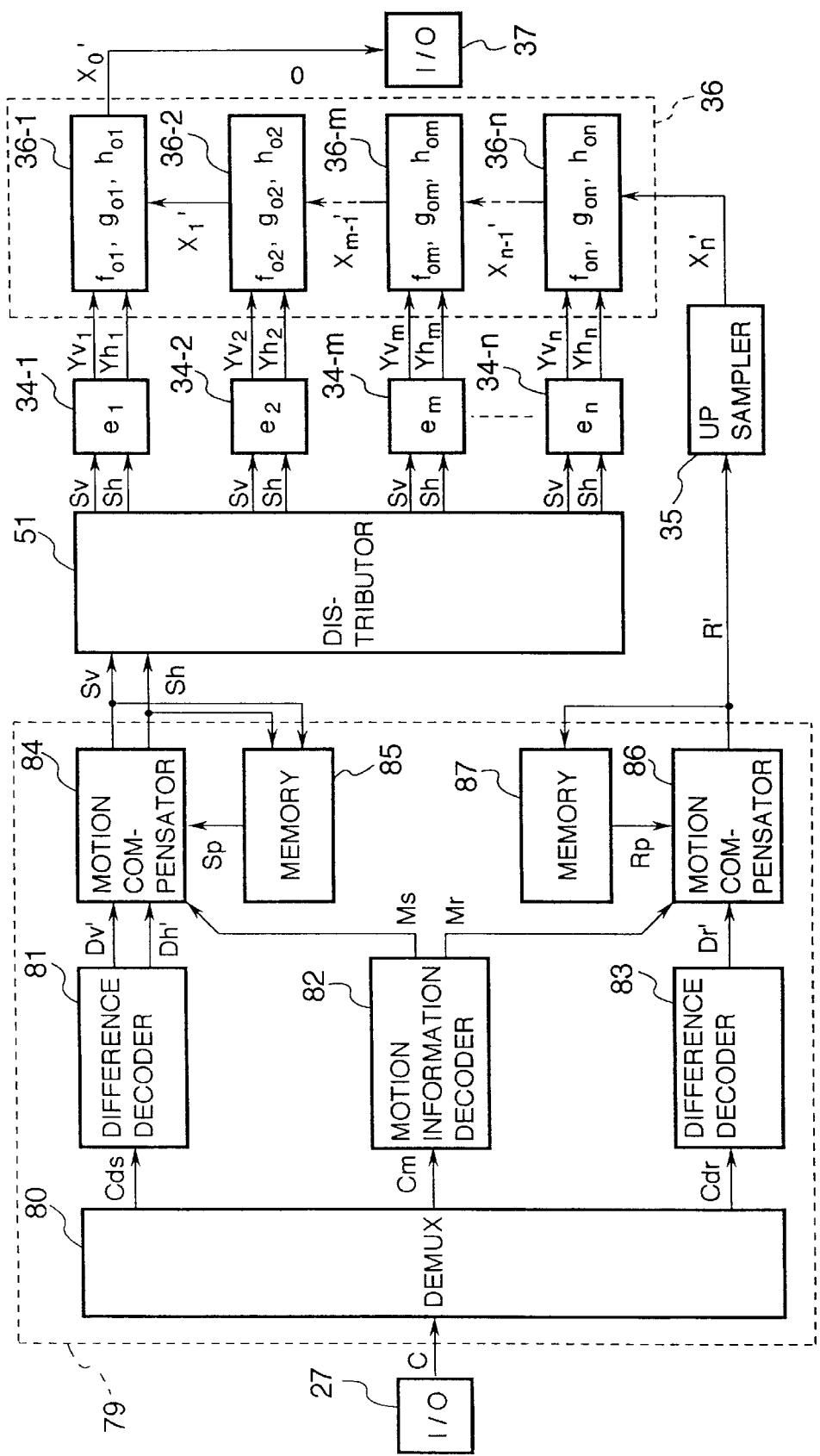
FIG. 14 is a block diagram of the digital image decoder in the seventh embodiment.

Referring to FIG. 14, the digital image decoder of the seventh embodiment is identical to the digital image decoder of the third embodiment except for the decoding section 79. The decoding section 79 comprises a demultiplexer 80, a motion information decoder 82, a pair of difference decoders 81 and 83, a pair of motion compensators 84 and 86, and a pair of memories 85 and 87.

The demultiplexer 80 receives the encoded image C from the input/output device 27 and separates it into edge difference information Cds, motion information Cm, and low-frequency difference information Cdr. Difference decoder 81 decodes Cds to obtain a pair of decoded edge difference images Dh' and Dv'. Motion information decoder 82 decodes Cm to obtain edge motion vectors Ms and low-frequency motion vectors Mr. Difference decoder 83 decodes Cdr to obtain a decoded reduced difference image Dr'.

Motion compensator 84 receives Dh', Dv' and Ms from decoders 81 and 82, receives a pair of previous edge images Sp from memory 85, and outputs a pair of edge images Sh and Sv to the distributor 51. Motion compensator 86 receives Mr and Dr' from decoders 82 and 83, receives a previous reduced image Rp' from memory 87, and outputs a decoded reduced image R' to the up sampler 35.

Next the operation of the seventh embodiment will be described. The description will be confined to the encoding section 65 and decoding section 79, since the other parts operate as in the third embodiment.

Referring again to FIG. 13, motion estimator 67 estimates motion in the reduced image R by, for example, the block-matching method, which involves computing the following quantity d(k, l) for blocks of pixels in the reduced image R and previous reduced image Rp, using various vectors (k, l).

$$d(k, l) = \sum_{i,j} |R(i, j) - Rp(i+k, j+l)|$$

That is, motion estimator 67 finds the total difference in pixel values between a block in the current reduced image R and a block displaced by k pixels horizontally and l pixels vertically from this block in the previous reduced image Rp. This computation is carried out for all vectors (k, l) within a designated search range; then the minimum resulting value d(k, l) is selected and its vector (k, l) is output as a motion vector. The entire procedure is repeated for other blocks in the current reduced image, until motion has been estimated throughout the image, thereby obtaining the low-frequency motion vectors Mr.

The reduced difference image Dr consists of the differences in pixel values between the current and previous reduced images that cannot be accounted for by the detected motion. That is, it consists of values of the form $$Dr(i, j) = R(i, j) - Rp(i+k, j+l)$$

where (k, l) is the motion vector of the block containing pixel R(i, j).

Motion estimator 66 carries out this block-matching process separately on the horizontal and vertical edge images Sh and Sv. The motion vector encoder 68 encodes the motion vectors Ms and Mr by, for example, a variable-length encoding method.

Difference decoder 69 encodes the edge difference images Dh and Dv by, for example, the same method as used by the edge image encoder 24 in the preceding embodiments. Difference encoder 74 encodes the reduced difference image by, for example, the same method as used by the low-frequency image encoder 25 in the preceding embodiments. The difference decoders 70 and 74 employ methods reverse to those of the difference encoders 69 and 73 to obtain the decoded reduced difference image Dr' and the pair of decoded edge difference images D'.

Adder 75 adds Dr' to the previous reduced image Rp and stores the resulting new reduced image in memory 76 for use as a previous reduced image in the next frame. Similarly, adder 71 adds the pair of decoded edge difference images D' to the previous pair of edge images Sp and stores the resulting pair of new edge images in memory 72 for use as previous edge images in the next frame.

Memory 76 has space for storing at least two complete reduced images, the previous image read by motion estimator 67 and the new image stored by adder 75 being stored in different memory locations. In one storage scheme the roles of these locations are swapped at, every frame, so what was the new image in one frame becomes the previous image in the next frame. Memory 72 can employ a similar scheme for storing edge images.

Block matching requires a large number of arithmetic operations, particularly in motion estimator 66, which must estimate motion in two full-size images Sh and Sv. Motion estimator 66 is preferably adapted to reduce the amount of computation by restricting the search range. For example, motion in a frame can to some extent be predicted from motion in preceding frames, and the search range can be narrowed on the basis of these predictions, a technique well known in the prior art. Also, after motion vectors for one of the two edge images Sh and Sv have been obtained, they can be used to narrow the search range for motion vectors in the other edge image. In the extreme case, block matching can be performed for just one of the two edge images, and the resulting motion vectors applied to both edge images.

Needless to say, the motion-vector search for a block terminates as soon as a vector (k, l) with d(k, l)=0 is found. This tends to happen quickly for many blocks in the edge images, because most pixel values in an edge image are usually zero. That is, edge detection in itself generally reduces the amount of motion-vector computation.

Referring again to FIG. 14, to describe the operation of decoding section 79, after the demultiplexer 80 separates the encoded image signal C into Cds, Cm, and Cr, the difference decoder 81 decodes Cds to obtained decoded edge difference images Dh' and Dv'. These images are identical to the decoded edge difference images obtained by the difference decoder 70 in the digital image encoder and denoted D' in FIG. 13. The motion information decoder 82 decodes Cm to obtain decoded motion vectors Ms and Mr. The motion vector encoding scheme is preferably a lossless encoding scheme, so these vectors Ms and Mr are identical to the motion vectors Ms and Mr in FIG. 13. The difference decoder 83 decodes Cdr to obtain a decoded reduced image Dr' which is identical to the decoded reduced image Dr' obtained by difference decoder 74 in FIG. 13.

For each block of difference values in the decoded reduced difference image Dr', motion compensator 86 obtains the motion vector (k, l) of the block from the motion information decoder 82, reads a previous block displaced by (k, l) in the previous image Rp stored in memory 87, and adds the difference values to this previous block to obtain a block in the decoded reduced image R'. After obtaining the complete reduced image R', it stores this newly decoded reduced image R' in memory 87 for use as the previous reduced image Rp in the next frame. Operating in a similar fashion, motion compensator 84 obtains horizontal and vertical edge images Sh and Sv from the decoded edge difference images Dh' and Dv', motion vectors Ms, and previous edge images Sp, and stores the new edge images Sh and Sv in memory 85 for use as previous edge images in the next frame. Memories 85 and 87 employ storage schemes similar to those of memories 72 and 76 in the digital image encoder.

Due to quantization error, for example, the decoded difference images Dh', Dv', and Dr' obtained by difference decoders 81 and 83 in the digital image decoder will not necessarily be identical to the difference images Dh, Dv, and Dr output by motion estimators 66 and 67 in the digital image encoder. They will, however, be identical to the decoded difference images obtained by difference decoders 70 and 74 in the digital image encoder, as noted above, so the new images stored in memories 85 and 87 in the digital image decoder will be identical to the new images stored in memories 72 and 76 in the digital image encoder. Accordingly, the motion estimators 66 and 67 and motion compensators 84 and 86 will always estimate and compensate for motion from the same previous images, even if the difference images are not decoded with perfect accuracy.

The combination of edge detection, down-sampling, and motion estimation and compensation enables very high video compression ratios to be achieved, particularly for images that tend to remain largely stationary. Such images include the images commonly encountered in video teleconferencing, video games, and a wide variety of so-called multimedia systems, which provide a video interface between a person and a computer. The present invention can be practiced to good advantage in systems like these.

Eighth Embodiment

The eighth embodiment combines features of the fourth and seventh embodiments.

Figure 15:
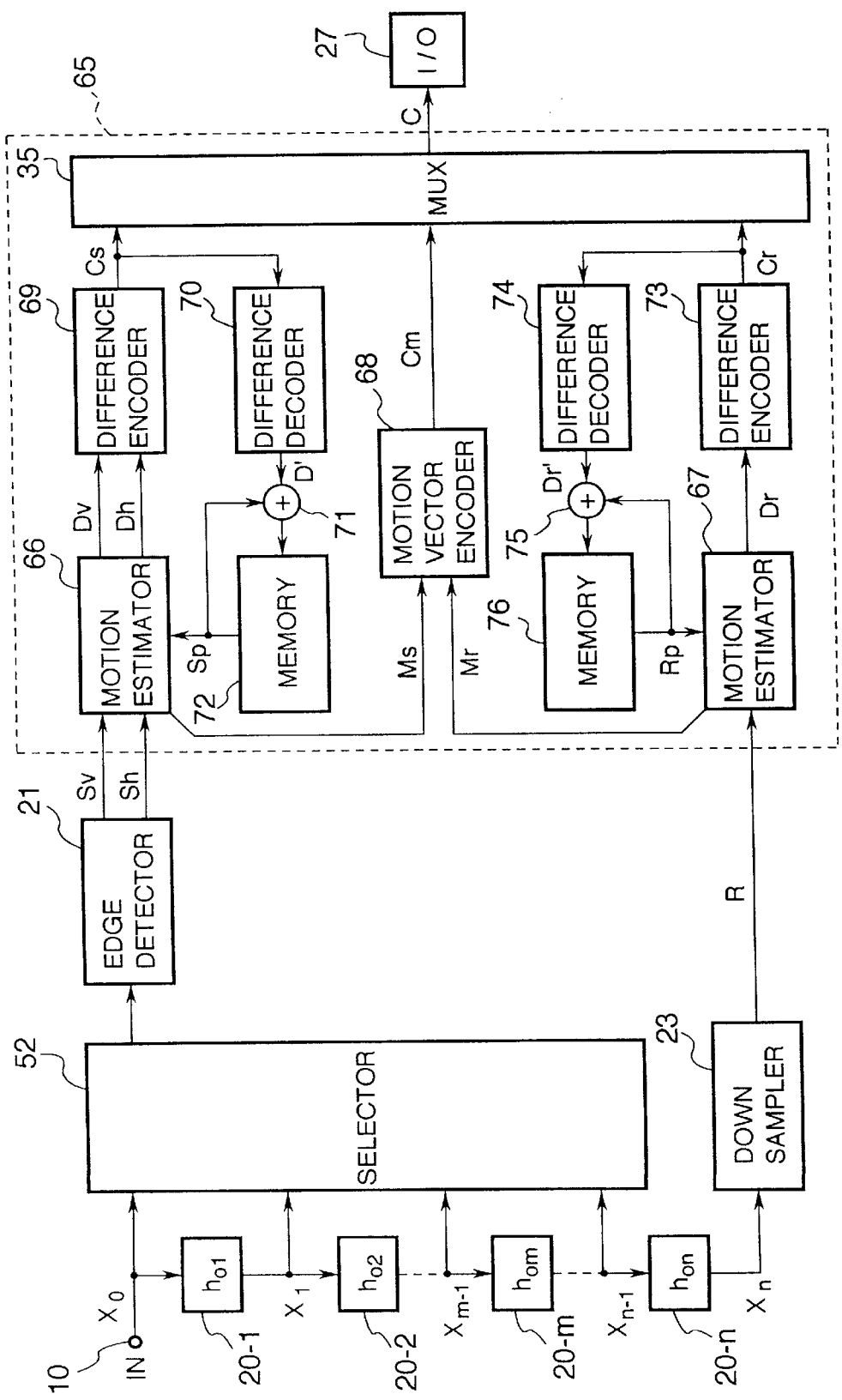
FIG. 15 is a block diagram of the digital image encoder in an eighth embodiment.

Referring to FIG. 15, the digital image encoder of the eighth embodiment has the same smoothing filters 20-1 to 20-n, edge detector 21, down sampler 23, and selector 52 as the fourth embodiment (FIG. 9), and the same motion-estimating encoding section 65 as tile seventh embodiment (FIG. 13). The digital image decoder of the eighth embodiment is identical to the digital image decoder of the seventh embodiment (FIG. 14).

The eighth embodiment operates as explained in the fourth and seventh embodiments, so further description will be omitted. By reducing the amount of edge detection, the eighth embodiment speeds up the encoding of moving images and enables frames to be encoded at a faster rate than the seventh embodiment.

Ninth Embodiment

The ninth embodiment is similar to the eighth embodiment, with further provisions for speeding up the computation ion of motion vectors.

Figure 16:
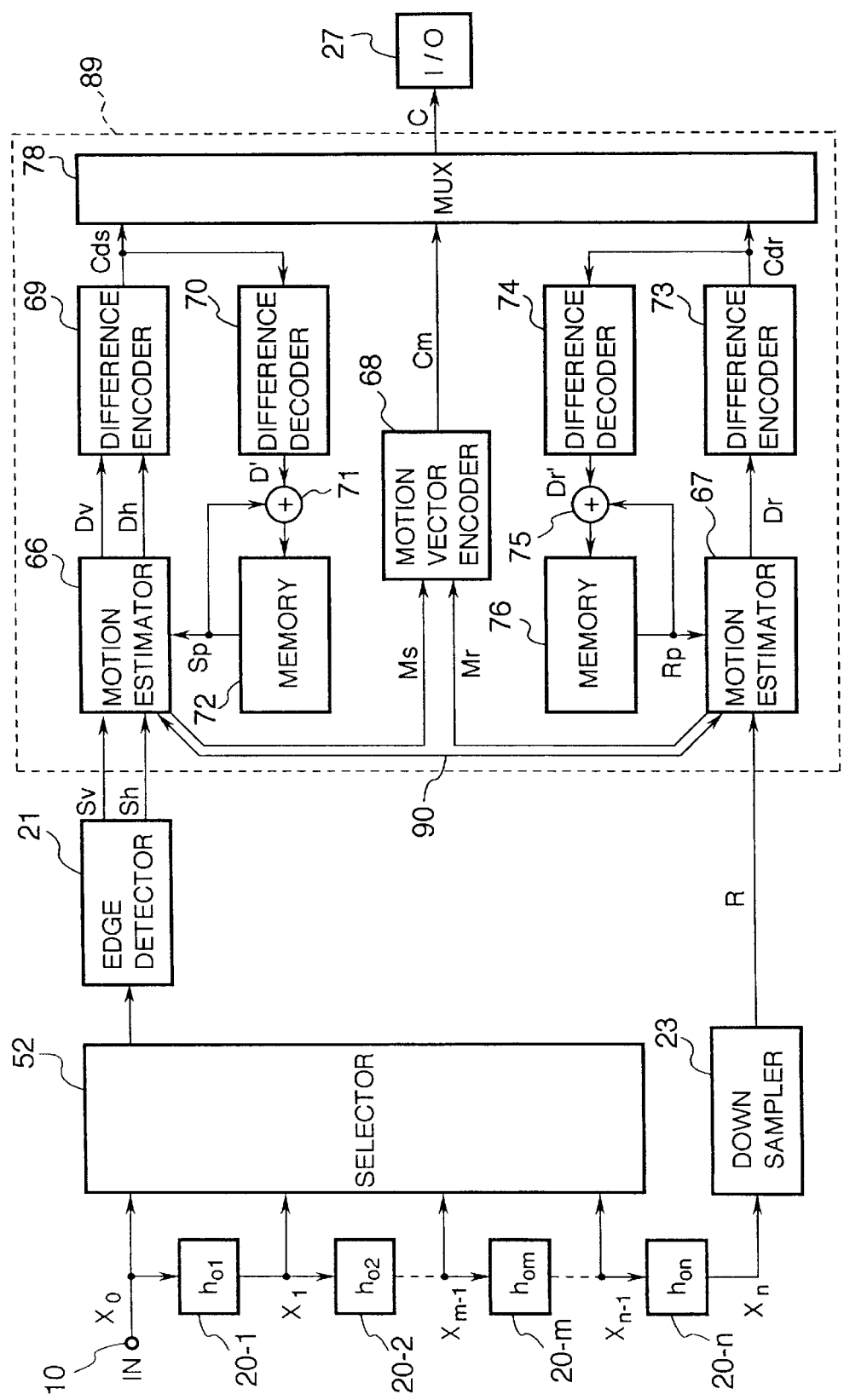
FIG. 16 is a block diagram of the digital image encoder in a ninth embodiment.

Referring to FIG. 16, the encoding section 89 of the digital image encoder of the ninth embodiment is similar to the encoding section 65 in FIGS. 13 and 15, but has an additional bidirectional interconnection 90 between motion estimators 66 and 67. This enables motion estimator 67 to receive the edge motion vectors Ms found by motion estimator 66, scale them down to the size of the reduced image R, and restrict the search for motion vectors in the reduced image R to vectors close to the scaled-down edge motion vectors. In the extreme case, the search can be eliminated entirely: the low-frequency motion vectors Mr can be computed directly from the edge motion vectors Ms.

Alternatively, motion estimator 66 can receive the motion vectors Mr found by block matching in the reduced image R, scale them up to the size of the edge images Sh and Sv, and restrict the search for motion vectors for Sh and Sv to vectors close to the scaled-up vectors. This scheme is particularly effective in detecting sudden, large motion.

Aside from this difference, the ninth embodiment has the same structure as the eighth embodiment and operates in the same way, so further description will be omitted. By narrowing down the search for motion vectors, the ninth embodiment enables frames to be encoded at a still faster rate than the eighth embodiment.

Tenth Embodiment

The tenth embodiment combines features of the fifth and seventh embodiments.

Figure 17:
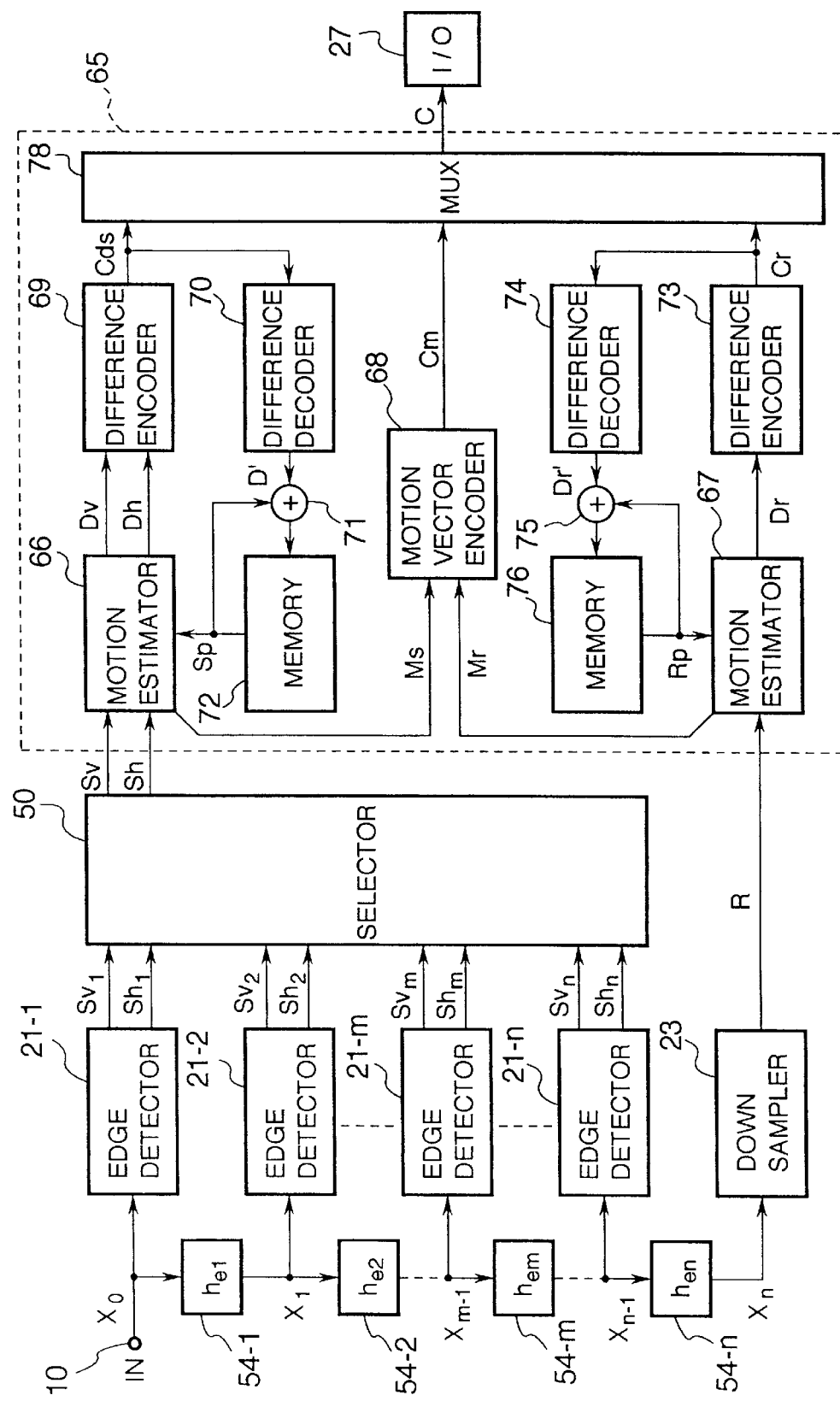
FIG. 17 is a block diagram of the digital image encoder in a tenth embodiment.
Figure 18:
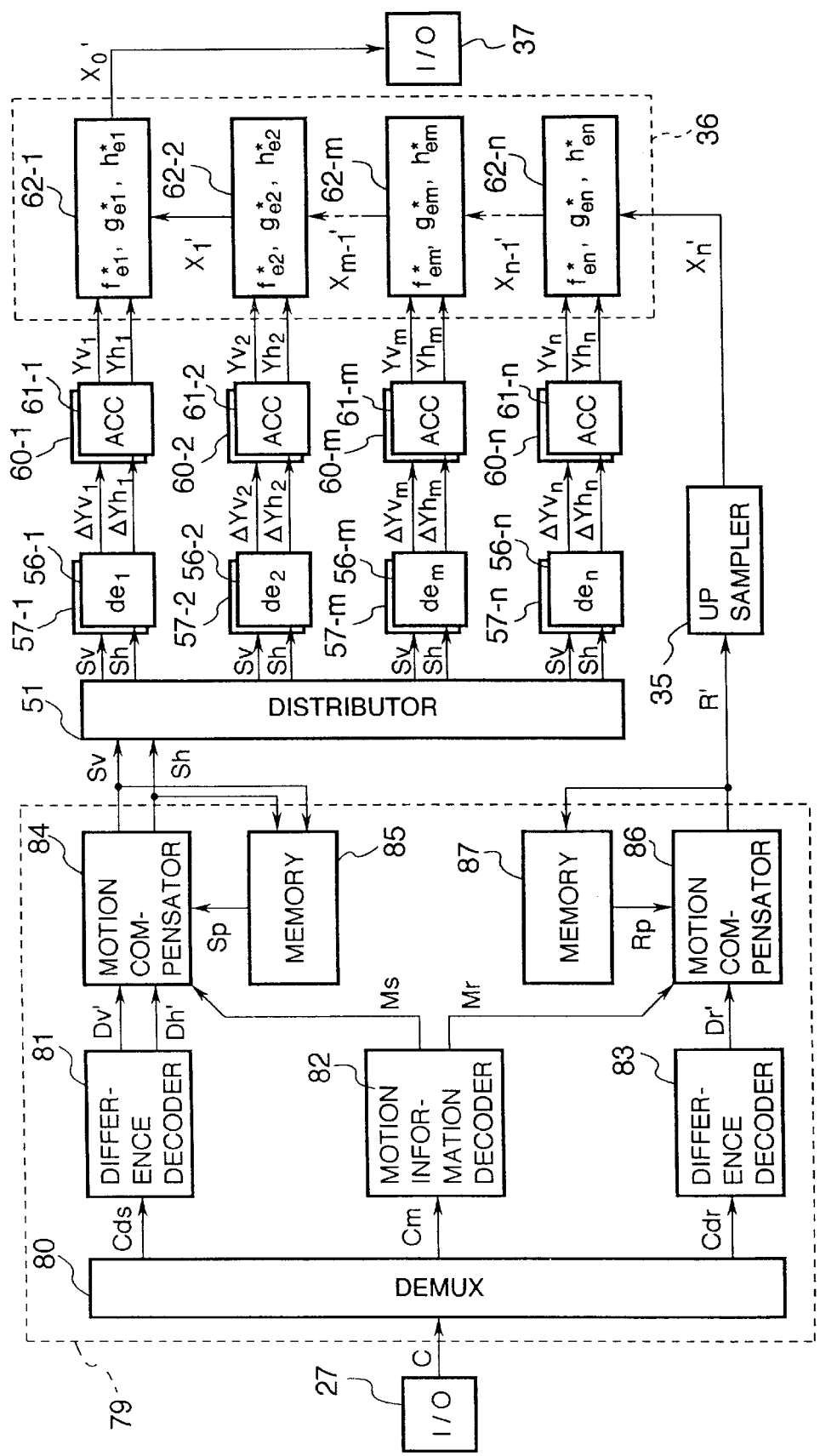
FIG. 18 is a block diagram of the digital image decoder in the tenth embodiment.

Referring to FIG. 17, the digital image encoder of the tenth embodiment has the same smoothing filters 54-1 to 54-n, edge detectors 21-1 to 21-n, down sampler 23, and selector 50 as the fifth embodiment (FIG. 10), and the same encoding section 65 as the seventh embodiment (FIG. 13). Referring to FIG. 18, the digital image decoder of the tenth embodiment has the same decoding section 79 as the seventh embodiment (FIG. 14), and the same up sampler 35, distributor 51, differential edge synthesizers 56-1 to 57-n, accumulators 60-1 to 61-n, and inverse wavelet transform processor 36 as the fifth embodiment (FIG. 11). The tenth embodiment operates as explained in the fifth and seventh embodiments, and provides similar effects, so further description will be omitted.

Eleventh Embodiment

The eleventh embodiment combines features of the sixth and seventh embodiments.

Figure 19:
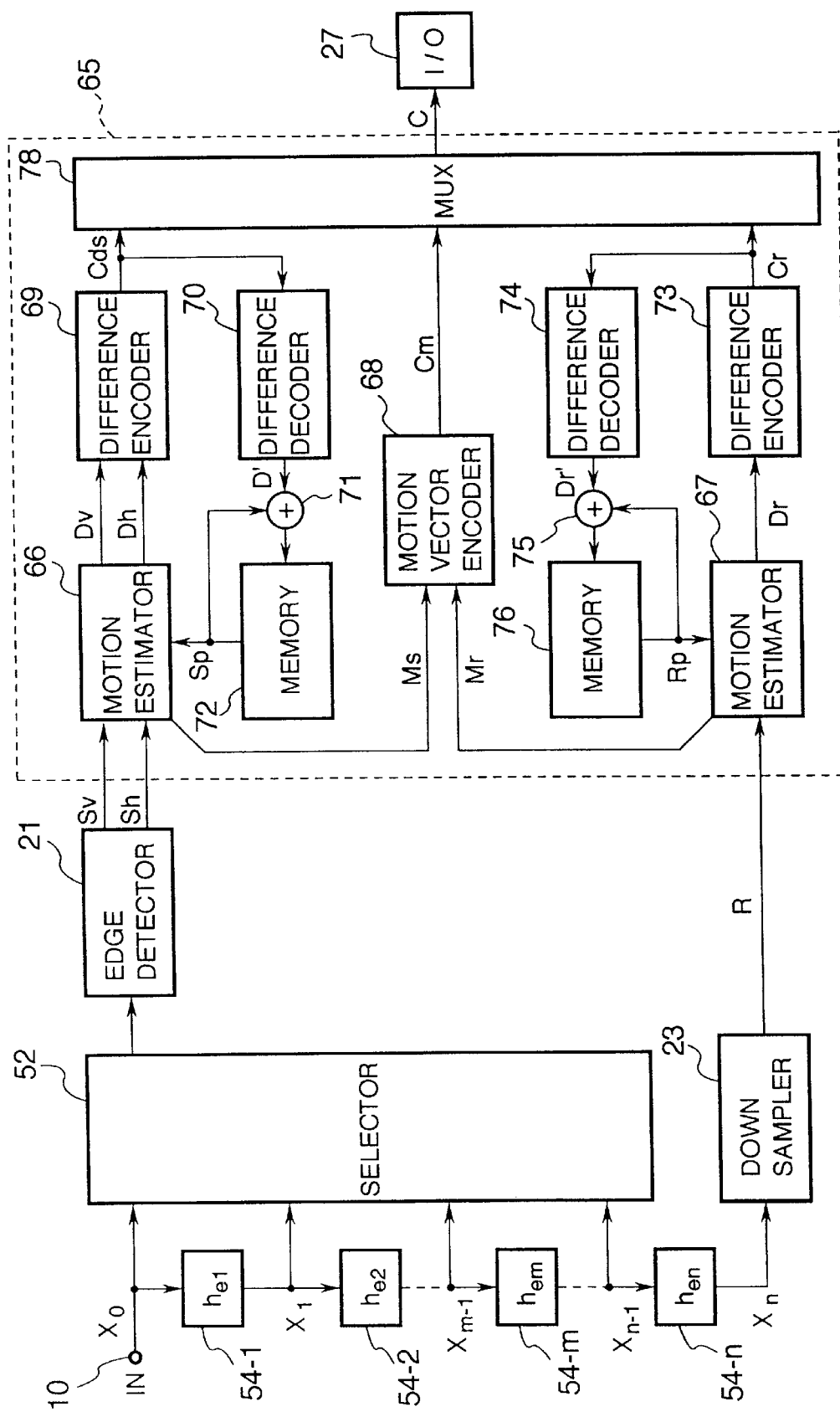
FIG. 19 is a block diagram of the digital image encoder in an eleventh embodiment.

Referring to FIG. 19, the digital image encoder of the eleventh embodiment has the same smoothing filters 54-1 to 54-n, edge detector 21, down sampler 23, and selector 52 as the sixth embodiment (FIG. 12), and the same encoding section 65 as the seventh embodiment (FIG. 13). The digital image decoder of the eleventh embodiment is identical to the digital image decoder of the seventh embodiment (FIG. 14). The eleventh embodiment operates as explained in the sixth and seventh embodiments, and provides similar effects, so further description will be omitted.

Twelfth Embodiment

The twelfth embodiment combines features of the ninth and eleventh embodiments.

Figure 20:
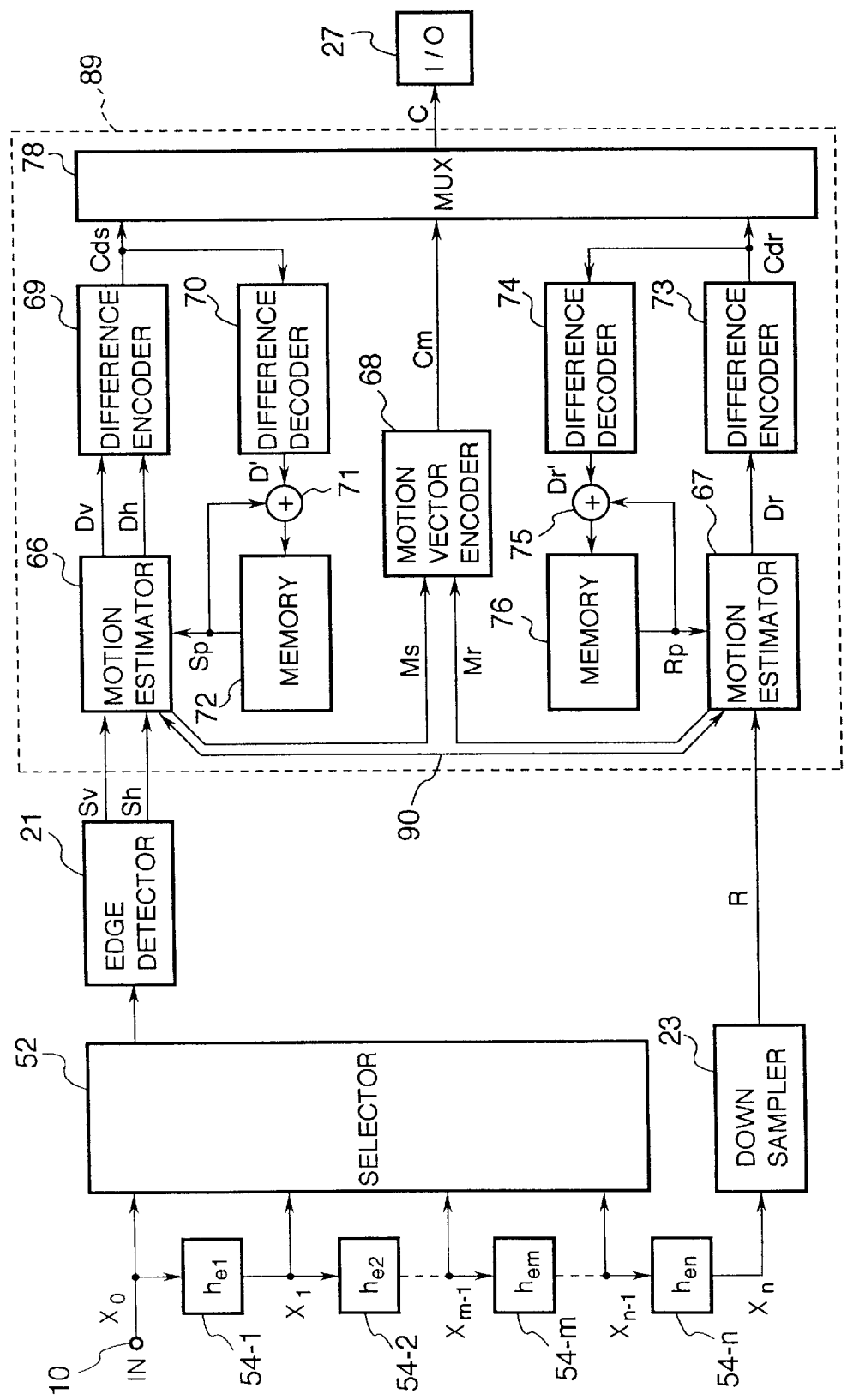
FIG. 20 is a block diagram of the digital image encoder in a twelfth embodiment.

Referring to FIG. 20, the digital image encoder of the twelfth embodiment has the same smoothing filters 54-1 to 54-n, edge detector 21, down sampler 23, and selector 52 as the eleventh embodiment (FIG. 18), and the same encoding section 89 as in the ninth embodiment (FIG. 16), with a bidirectional interconnection 90 between the motion estimators 66 and 67. The digital image decoder of the eleventh embodiment is identical to the digital image decoder of the tenth and eleventh embodiments (FIG. 18). The twelfth embodiment operates as explained in these preceding embodiments, and provides similar effects, so further description will be omitted.

As described above, the invented encoding and decoding method and devices provide high compression rates with modest amounts of computation. Although there is some loss of detail, reconstructed images are not distorted, and because high-frequency information is synthesized in a single step instead of by iteration, the reconstruction process is reliably completed within a short and definite time. The invention can be usefully applied to both still and moving images for a wide variety of purposes, in a wide variety of systems.

The scope of the invention is not restricted to the embodiments described above, but includes such further variations as the following.

Instead of producing separate horizontal and vertical edge images, the edge detector or detectors can output a single edge image in which each edge point has both a sharpness value S(i, j) and direction angle θ (i, j), computed from Sh(i, j) and Sv(i, j) by, for example, the following formulas:

$$S(i, j) = sgn[Sh(i, j)] \cdot [Sh(i, j)^2 + Sv(i, j)^2]^{1/2}$$

$$\theta(i, j) = arctan[Sv(i, j)/Sh(i, j)]$$

In these formulas, sgn denotes the algebraic sign (plus or minus one), and arctan the inverse tangent function. The encoding section then has only one set of edge positions to encode. The decoding section in the digital image decoder can recover Sh(i, j) and Sv(i, j) from S(i, j) and θ (i, j).

This method of encoding only a single edge image is particularly effective if chain encoding is employed, because the direction angle tenets to change only slowly along a chain of edge points. Moreover, the angle tends to be perpendicular to the direction of the chain, so it is possible to have the edge detector calculate only the above edge sharpness S(i, j), and let the decoder infer the direction angle θ (i, j) of an edge point (i, j) from the direction of the chain in the vicinity of that point. The compression ratio can be significantly improved in this way, although with some loss of reconstruction accuracy.

If the seventh to twelfth embodiments are varied in this way, the new and previous edge images Sp stored in memories 72 and 85 can be a single edge image with pixel values S(i, j). After storing a single new edge image in memory 85, motion compensator 84 infers θ (i, j), calculates Sh(i, j) and Sv(i, j), and generates horizontal and vertical edge images Sh and Sv for output to the distributor 51

The number of smoothing filters need not be the same as the number of edge synthesizers. If the desired edge resolution is known in advance, the digital image encoder requires no more than two smoothing filters: one to smooth the input image to the desired resolution for edge detection, and another to obtain the low-frequency image by further smoothing. Despite this, the digital image decoder may employ an arbitrary number of edge synthesizers for reconstruction. In this case it is not necessary for the low-pass filters in the digital image encoder and high-pass filters in the digital image decoder to form complementary pairs.

Obtaining a series of low-pass or high-pass filters by successive doubling of the tap spacing is complementary convenient, but the low-pass and high-pass filters do not have to be obtained in this way, and their cut-off frequencies to not have to be related by factors of one-half. Moreover, the low-pass filters in the digital image encoder do not have to be cascaded; a set of parallel low-pass filters could be used Since the difference-of-differences edge detection method is equivalent to filtering by a second-derivative filter d with coefficients (1, −2, 1), the encoder could also be structured so that the input image is filtered by a cascaded series of filters comprising d, $h_1$, $h_2$, . . . , $h_{n-1}$ to detect edge points at various resolutions. The input image can then be separately filtered by a single filter equal to the convolution of $h_1$, $h_2$, . . . , $h_n$ to obtain the low-frequency image ($h_1$, . . . , $h_n$ are low-pass filters).

Edge detection is not limited to the difference-of-differences method. This method is preferred, but other methods can be employed.

The standard edge from which the edge synthesis filters are generated need not be an edge of the type shown in FIGS. 3 and 4, in which pixel values change at first one constant rate, then another constant rate. Other types can be used, provided the standard edge has only one point which would be detected as an edge point by the edge detector.

Down-sampling and up-sampling can be omitted, if the encoding method employed for the low-frequency image provides adequate data compression without down-sampling.

In the seventh to twelfth embodiments, if the difference images Dh, Dv, and Dr produced by motion estimation are encoded by a lossless encoding scheme, memories 72 and 76 in the digital image encoders can be updated by direct input of edge images Sh and Sv and reduced image R. Difference decoders 70 and 74 and adders 71 and 75 can then be omitted.

Motion estimation and compensation need not be performed in every frame. These processes can be omitted occasionally, to prevent unchecked propagation of errors from frame to frame.

Motion estimation and compensation can of course be added to the one-stage digital image encoders and decoders of the first two embodiments, to compress moving images.

Those skilled in the art will recognize that still further variations are possible without departing from the scope claimed below.

What is claimed is:

1. A method of encoding a digitized image consisting of pixels having pixel values, comprising the steps of:

filtering said digitized image by a series of low-pass filters having progressively lower cut-off frequencies, thereby generating a series of filtered images culminating in a low-frequency image, which was filtered with a lowest cut-off frequency among said cut-off frequencies;

down-sampling said low-frequency image, thereby generating a reduced image smaller in size than said digitized image;

encoding said reduced image, thereby generating low-frequency information;

generating an edge image by detecting edges in one image among said digitized image and said filtered images, excluding said low-frequency image;

encoding said edge image, thereby generating edge information; and sending said edge information and said low-frequency information to an input/output device.

2. The method of claim 1, wherein said low-pass filters have even symmetry.

3. The method of claim 1, wherein detecting edges comprises detecting variations in rate of change of intensity from pixel to pixel.

4. The method of claim 1, wherein generating an edge image comprises:
   detecting edges in a horizontal direction, thereby generating a horizontal edge image; and
   detecting edges in a vertical direction, thereby generating a vertical edge image.

5. The method of claim 1, wherein generating an edge image comprises:
   generating a plurality of edge images by detecting edges in a plurality of images among said digitized image and said filtered images, excluding said low-frequency image; and
   selecting one of said plurality of edge images.

6. The method of claim 1, wherein generating an edge image comprises:
   selecting one image among said digitized image and said filtered images, excluding said low-frequency image; and
   detecting edges in said one image.

7. The method of claim 1, said method being applied to successive frames of a moving image, wherein the step of encoding said edge image comprises:
   reading a previous edge image, pertaining to a previous frame, from a first memory;
   generating edge motion vectors by detecting motion of said edge image with respect to said previous edge image;
   encoding said edge motion vectors, thereby generating edge motion information as part of said edge information;
   generating an edge difference image by detecting differences between said edge image and said previous edge image, over and above said motion of said edge image; and
   encoding said edge difference image, thereby generating edge difference information as another part of said edge information.

8. The method of claim 7, wherein encoding said edge image comprises the further steps of:
   decoding said edge difference information, thereby generating a decoded edge difference image;
   adding said decoded edge difference image to said previous edge image to generate a new edge image; and
   storing said new edge image in said first memory, for use as a previous edge image in a subsequent frame.

9. The method of claim 7, wherein the step of encoding said reduced image comprises:
   reading a previous reduced image, pertaining to said previous frame, from a second memory;
   generating low-frequency motion vectors by detecting motion of said reduced image with respect to said previous reduced image;
   encoding said low-frequency motion vectors, thereby generating low-frequency motion information as part of said low-frequency information;
   generating a reduced difference image by detecting differences between said reduced image and said previous reduced image, over and above said motion of said reduced image; and
   encoding said reduced difference image, thereby generating low-frequency difference information as another part of said low-frequency information.

10. The method of claim 9, wherein encoding said reduced image comprises the further steps of:
    decoding said low-frequency difference information, thereby generating a decoded reduced difference image;
    adding said decoded reduced difference image to said previous reduced image to generate a new reduced image; and
    storing said new reduced image in said second memory, for use as a previous reduced image in a subsequent frame.

11. The method of claim 9, wherein generating edge motion vectors comprises using said low-frequency motion vectors to select a range of search for said edge motion vectors.

12. The method of claim 9, wherein generating low-frequency motion vectors comprises using said edge motion vectors to select a range of search for said low-frequency motion vectors.

13. A method of reconstructing a digitized image from encoded edge information and low-frequency information, comprising the steps of:
    generating a horizontal edge image and a vertical edge image by decoding said edge information;
    synthesizing a series of pairs of high-frequency images by filtering said horizontal edge image horizontally with a series of edge synthesis filters, and filtering said vertical edge image vertically with said series of edge synthtesis filters, wherein said series of edge synthesis filters have progressively decreasing cut-off frequencies;
    generating a reduced image by decoding said low-frequency information;
    up-sampling said reduced image, thereby generating a low-frequency image equal in size to said high-frequency images;
    performing an inverse wavelet transform on said series of pairs of high-frequency images and said low-frequency image, thereby obtaining said digitized image; and
    sending said digitized image to an input/output device.

14. The method of claim 13, wherein said series of edge synthesis filters is generated by filtering a standard edge, having just one sharp variation, by a corresponding series of high-pass filters with progressively decreasing cut-off frequencies.

15. The method of claim 14, wherein said standard edge consists of a first part and a second part, with pixel values changing at one constant rate in said first part and at a different constant rate in said second part.

16. The method of claim 14, wherein the step of performing an inverse wavelet transform comprises filtering said pairs of high-frequency images by respective conjugate filters of said series of high-pass filters.

17. The method of claim 14, wherein said high-pass filters have even symmetry.

18. The method of claim 14, wherein said high-pass filters have odd symmetry.

19. The method of claim 18, wherein filtering said pair of edge images by said edge synthesis filters comprises:
    taking differences between consecutive coefficients of said edge synthesis filters, thereby generating a series of differential edge synthesis filters;
    filtering said horizontal edge image horizontally by said differential edge synthesis filters, thereby synthesizing a series of differential high-frequency images;

accumulating values in respective horizontal differential high-frequency images;

filtering said vertical edge image vertically by said differential edge synthesis filters, thereby synthesizing a series of differential high-frequency images; and accumulating values in respective vertical differential high-frequency images.

20. The method of claim 13, said method being applied to successive frames of an encoded moving image, wherein said edge information comprises edge difference information and edge motion information, and decoding said edge information comprises:

decoding said edge difference information to obtain an edge difference image;

decoding said edge motion information to obtain edge motion vectors;

reading a previous edge image, pertaining to a previous frame, from a third memory;

adding said edge difference image to said previous edge image according to said edge motion vectors, to obtain a new edge image; and storing said new edge image in said third memory for use as a previous edge image of a subsequent frame.

21. The method of claim 20, wherein said low-frequency information comprises low-frequency difference information and low-frequency motion information, and decoding said low-frequency information comprises:

decoding said low-frequency difference information to obtain a reduced difference image;

decoding said low-frequency motion information to obtain low-frequency motion vectors;

reading a previous reduced image, pertaining to said previous frame, from a fourth memory;

adding said reduced difference image to said previous reduced image according to said low-frequency motion vectors, to obtain said reduced image; and storing said reduced image in said fourth memory for use as a previous reduced image of a subsequent frame.

* * * * *